United States Patent
Kalaev et al.

(10) Patent No.: US 11,048,136 B2
(45) Date of Patent: Jun. 29, 2021

(54) REPROGRAMMABLE ELECTRO-CHEMO-OPTICAL DEVICES AND METHODS FOR USING THE SAME

(71) Applicant: Massachusetts Institute of Technology, Cambridge, MA (US)

(72) Inventors: Dmitri Kalaev, Cambridge, MA (US); Harry L. Tuller, Wellesley, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 181 days.

(21) Appl. No.: 16/260,860

(22) Filed: Jan. 29, 2019

(65) Prior Publication Data
US 2019/0235340 A1 Aug. 1, 2019

Related U.S. Application Data

(60) Provisional application No. 62/623,142, filed on Jan. 29, 2018.

(51) Int. Cl.
*G02F 1/1524* (2019.01)
*G02F 1/163* (2006.01)

(52) U.S. Cl.
CPC ............ *G02F 1/1524* (2019.01); *G02F 1/163* (2013.01)

(58) Field of Classification Search
CPC .... G02F 1/1524; G02F 1/1523; G02F 1/1514; G02F 1/163
USPC ........................................................ 359/275
See application file for complete search history.

(56) References Cited

U.S. PATENT DOCUMENTS

| | | | |
|---|---|---|---|
| 3,521,941 A | 7/1970 | Deb et al. | |
| 5,202,788 A | 4/1993 | Weppner | |
| 7,580,596 B1 | 8/2009 | Meijer et al. | |
| 8,054,669 B2 | 11/2011 | Meijer et al. | |
| 9,785,031 B2 * | 10/2017 | Mattox | G02F 1/1524 |
| 9,791,760 B2 * | 10/2017 | Garcia | G02F 1/155 |
| 2009/0180728 A1 | 7/2009 | Meijer et al. | |
| 2015/0277202 A1 * | 10/2015 | Mattox | G02F 1/1524 |
| | | | 359/275 |

(Continued)

OTHER PUBLICATIONS

Chen et al., "Voltage-Controlled Nonstoichiometry in Oxide Thin Films: Pr0.1 Ce0.9 O2-δ Case Study." Advanced Functional Materials 24.48 (2014): 7638-7644.

(Continued)

*Primary Examiner* — William R Alexander
(74) *Attorney, Agent, or Firm* — Smith Baluch LLP

(57) ABSTRACT

Reconfigurable, active optical components can flexibly manipulate light. One example of these components is an electro-chemo-optical device that utilizes a metal oxide film with a complex refractive index that varies as a function of an oxygen vacancy concentration. The optical device may include a metal oxide film, a first electrode, and a second electrode. The first electrode and the second electrode may be used to supply a bias voltage to induce a change in the oxygen vacancy concentration in order to change the optical properties (absorbance, transmittance, and/or reflectance) of the optical device. The magnitude and spatial distribution of the oxygen vacancy concentration may be altered to affect the optical properties of the optical device. In some designs, the optical device may also include an ionic conductor and oxygen source to supply/receive oxygen ions to/from the metal oxide film.

21 Claims, 17 Drawing Sheets

(56) References Cited

U.S. PATENT DOCUMENTS

| | | | |
|---|---|---|---|
| 2016/0033837 A1 | 2/2016 | Bjornard et al. | |
| 2016/0139476 A1* | 5/2016 | Garcia | G02F 1/1524 |
| | | | 359/275 |
| 2017/0186777 A1* | 6/2017 | Toyotaka | H01L 27/1266 |
| 2017/0186829 A1* | 6/2017 | Yamazaki | H01L 27/3258 |
| 2017/0309852 A1* | 10/2017 | Seo | H01L 51/5012 |

OTHER PUBLICATIONS

De Souza et al., "Probing diffusion kinetics with secondary ion mass spectrometry." MRS Bulletin 34.12 (2009): 907-914.

Dieterle et al., "Raman spectroscopy of molybdenum oxides Part I. Structural characterization of oxygen defects in MoO3-x by DR UV/VIS, Raman spectroscopy and X-ray diffraction." Physical Chemistry Chemical Physics 4.5 (2002): 812-821.

Ganduglia-Pirovano et al., "Oxygen vacancies in transition metal and rare earth oxides: Current state of understanding and remaining challenges." Surface science reports 62.6 (2007): 219-270.

He et al., "Memristive properties of hexagonal WO3 nanowires induced by oxygen vacancy migration." Nanoscale research letters 8.1 (2013): 50, 8 pages.

International Search Report and Written Opinion in International Patent Application No. PCT/US19/15598 dated Apr. 16, 2019, 19 pages.

Jacobson, "Materials for solid oxide fuel cells." Chemistry of Materials 22.3 (2009): 660-674.

Kalaev et al., "Negative differential resistance and hysteresis in Au/MoO3-δ/Au devices." RSC Advances 7.60 (2017): 38059-38068.

Kalaev et al., "On conditions leading to crossing of I—V curve in metal1| mixed-ionic-electronic-conductor| metal2 devices." Solid State Ionics 241 (2013): 17-24.

Kalaev et al., In-Situ Optical Absorption Spectroscopy for Investigating Point Ionic Defects Concentration and Kinetics in Mixed-Ionic-Electronic-Conductor Thin Films. 2018 MRS Fall Meeting & Exhibit. Nov. 25-30, 2018 Boston Massachusetts. 1 page.

Kilner et al., "The isotope exchange depth profiling (IEDP) technique using SIMS and LEIS." Journal of Solid State Electrochemistry 15.5 (2011): 861-876.

Kim et al., "Defect chemistry of Pr doped ceria thin films investigated by in situ optical and impedance measurements." Chemistry of Materials 29.5 (2017): 1999-2007.

Kim et al., "Investigation of nonstoichiometry in oxide thin films by simultaneous in situ optical absorption and chemical capacitance measurements: Pr-doped ceria, a case study." Chemistry of Materials 26.3 (2014): 1374-1379.

Kim et al., "Optically derived energy band gap states of Pr in ceria." Solid State Ionics 225 (2012): 198-200.

Prasomsri et al., "Effective hydrodeoxygenation of biomass-derived oxygenates into unsaturated hydrocarbons by MoO3 using low H2 pressures." Energy & Environmental Science 6.6 (2013): 1732-1738.

Riess et al., "Odd rectification, hysteresis and quasi switching in solid state devices based on mixed ionic electronic conductors." Solid State Ionics 225 (2012): 161-165.

Riess, Electrochemistry of Mixed Ionic-Electronic Conductors, in: P.J. Gellings, H.J.M. Bouwmeester (Eds.), CRC Handb. Solid State Electrochem., CRC Press, Inc, 1997: pp. 223-268. Chapter 7.

Seidel et al., "Prominent electrochromism through vacancy-order melting in a complex oxide." Nature communications 3 (2012): 799, 6 pages.

Tuller et al., "Point defects in oxides: tailoring materials through defect engineering." Annual Review of Materials Research 41 (2011): 369-398.

Wang et al., "Optically reconfigurable metasurfaces and photonic devices based on phase change materials." Nature Photonics 10.1 (2016): 60. 13 pages.

Waser et al., "Redox-based resistive switching memories—nanoionic mechanisms, prospects, and challenges." Advanced materials 21.25-26 (2009): 2632-2663.

Waser, "Bulk conductivity and defect chemistry of acceptor?doped strontium titanate in the quenched state." Journal of the American Ceramic Society 74.8 (1991): 1934-1940.

You et al., "Flexible mixed-potential-type (MPT) NO2 sensor based on an ultra-thin ceramic film." Sensors 17.8 (2017)): 1740. 14 pages.

Zanotto et al., "Metasurface reconfiguration through lithium ion intercalation in a transition metal oxide." arXiv preprint arXiv:1810.03351 (2018). 6 pages.

Zhou et al., "Defect engineering of two-dimensional WO3 nanosheets for enhanced electrochromism and photoeletrochemical performance." Applied Surface Science 400 (2017): 57-63.

* cited by examiner

US 11,048,136 B2

REPROGRAMMABLE ELECTRO-CHEMO-OPTICAL DEVICES AND METHODS FOR USING THE SAME

CROSS-REFERENCE TO RELATED PATENT APPLICATION(S)

This application claims priority, under 35 U.S.C. § 119(e), to U.S. Application No. 62/623,142, filed on Jan. 29, 2018, and entitled "Reprogrammable Optical Devices", which is incorporated herein by reference in its entirety.

GOVERNMENT SUPPORT

This invention was made with Government support under Grant No. DE-SC0002633 awarded by the Department of Energy (DOE). The Government has certain rights in the invention.

BACKGROUND

Active optical components can enable reconfigurable, compact optical systems for various applications including, but not limited to, amplitude modulation, phase modulation, beam steering, filtering, and attenuation. Depending on the application, active optical components may have multiple design constraints on their performance. Such constraints may include volatile/non-volatile operation, time and frequency response characteristics, robustness to various operating environments, size constraints, power consumption, reliability, and spectral tunability. Previous approaches towards reconfigurable, active optical components include thermally induced phase changes in chalcogenide materials and intercalation of lithium into oxide materials.

SUMMARY

The present disclosure is directed to various reprogrammable electro-chemo-optical devices (also referred to as "optical devices") and methods for using reprogrammable electro-chemo-optical devices. An example optical device includes a metal oxide film with a complex refractive index that varies as a function of oxygen vacancy concentration.

In one exemplary design, an optical device includes a metal oxide film disposed between a first electrode and second electrode. The first electrode and the second electrode are electrically coupled to a voltage source. Furthermore, the first electrode and the second electrode are ion blocking such that oxygen vacancies in the metal oxide film are not exchanged with the environment. The optical device may include a substrate to mechanically support the other layers during manufacture and handling. Applying a bias voltage across the metal oxide film using the first electrode and the second electrode creates a gradient in the oxygen vacancy concentration, thus inducing an oxygen vacancy polarization. The oxygen vacancy polarization changes the average complex refractive index of the metal oxide film, thus changing the optical properties (e.g., absorbance, transmittance, reflectance) of the optical device. For some applications, the change in the average complex refractive index may also change the optical path length in applications such as phase modulation. The exact nature of these changes depends on the material used to form the metal oxide film and the structure of the optical device.

In another exemplary design, an optical device includes a metal oxide film coupled to an ionic conductor. The metal oxide film and ionic conductor are disposed between a first electrode and a second electrode. The first electrode and the second electrode are electrically coupled to a voltage source. Here, the ionic conductor and the second electrode are ion conducting while the first electrode is ion blocking. When a bias voltage is applied across the ionic conductor using the first electrode and the second electrode, an exchange of oxygen vacancies (or equivalently oxygen ions) occurs between the metal oxide film and an oxygen source coupled to the optical device through the ionic conductor and the second electrode. The oxygen source may be oxygen gas in an environment or oxygen stored in a layer (e.g., a solid mixed ionic-electronic conductor thin film) coupled to the metal oxide film. Depending on the polarity of the bias voltage, oxygen vacancies may be electrochemically pumped into or out of the metal oxide film, thus changing the overall oxygen vacancy concentration of the metal oxide film. In this case, the oxygen vacancy concentration may remain substantially uniform throughout the metal oxide film. A change in the oxygen vacancy concentration results in a corresponding change in the complex refractive index of the metal oxide film, thus changing the device's absorbance, transmittance, and/or reflectance.

An exemplary optical device may include a first a first electrode, which is substantially transparent to at least one wavelength of light and has an ionic conductance less than about $10^{-8}$ S, a second electrode, and a metal oxide film disposed between the first electrode and the second electrode. A bias voltage may be applied across the first electrode and the second electrode to change a mobile oxygen vacancy concentration in the metal oxide film, thereby changing a complex refractive index of the metal oxide film. The optical device may further include a solid electrolyte layer, disposed between the metal oxide film and the second electrode, to exchange oxygen ions with the metal oxide film in response to the bias voltage. The second electrode may be substantially transparent to the at least one wavelength of light. The second electrode may have an ionic conductance of less than about $10^{-8}$ S.

The metal oxide film may have a thickness from about 10 nm to about 500 nm. The metal oxide film may include at least one of praseodymium-doped ceria, iron doped strontium titanate, lanthanum doped barium tin oxide, tungsten oxide, or molybdenum trioxide. The bias voltage may cause the mobile oxygen vacancy concentration in the metal oxide film to change from being substantially uniform to varying spatially such that an oxygen vacancy polarization is induced. The oxygen vacancy polarization decreasing a transmittance of the metal oxide film at the at least one wavelength of light. The removal of the bias voltage may cause the mobile oxygen vacancy concentration in the metal oxide film to become substantially uniform, thus increasing the transmittance of the metal oxide film at the at least one wavelength of light. The bias voltage may cause an increase in the mobile oxygen vacancy concentration by electrochemically pumping oxygen ions out of the metal oxide film and through the second electrode. The increase in the mobile oxygen vacancy concentration may increase the transmittance of the optical device at the at least one wavelength of light. The optical device may also include an oxygen storage layer, disposed on the second electrode, to supply oxygen ions to and receive oxygen ions from the metal oxide film.

An exemplary method of changing a transmittance of an optical device comprising a metal oxide film may include the following steps: (1) applying a bias voltage across the metal oxide film with a transparent electrode such that the bias voltage causes a mobile oxygen vacancy concentration in the metal oxide film to change, thus changing the metal oxide film from an opaque state to a transparent state, and (2) while the metal oxide film is in the transparent state, transmitting light through the metal oxide film and the transparent electrode. The method may further include the step of preventing oxygen ions from leaving or entering the metal oxide film while applying the bias voltage. The step of applying the bias voltage may include applying a positive bias voltage that electrochemically pumps oxygen ions into the metal oxide film. The step of applying the bias voltage may include applying a negative bias voltage that electrochemically pumps oxygen ions out of the metal oxide film. The method may further include the step, before applying the bias voltage, of heating the metal oxide film to increase an ionic conductance of the metal oxide film such that the change in the mobile oxygen vacancy concentration occurs in less than 1 ns. Heating the metal oxide film may include applying at least one of an electrical pulse or a laser pulse to the metal oxide film. The method may further include the steps of cooling the metal oxide film such that the mobile oxygen vacancy concentration varies less than 1% for more than 1 ns and removing the bias voltage applied to the pair of electrodes. The method may further include the step of removing the bias voltage while keeping the metal oxide film in the transparent state. The applied bias voltage may be a first bias voltage having a first polarity. In subsequent steps, the method may include applying a second bias voltage having a second polarity opposite to the first polarity to the metal oxide film where the second bias voltage causes an increase in the mobile oxygen vacancy concentration that changes the metal oxide film from the transparent state to the opaque state. The change in the metal oxide film from the opaque state to the transparent state may occur in less than about 100 ns.

Another exemplary optical device may include a first transparent, ionically blocking electrode, a second transparent, ionically blocking electrode, and a metal oxide film, disposed between the first transparent, ionically blocking electrode and the second transparent, ionically blocking electrode, which undergoes a spatial redistribution of mobile oxygen vacancies in response to a bias voltage applied across the first transparent, ionically blocking electrode and the second transparent, ionically blocking electrode. The spatial redistribution of mobile oxygen vacancies causes a change in a complex refractive index of the metal oxide film.

Another exemplary optical device may include a transparent, ionically blocking electrode, a porous electrode, a metal oxide film disposed between the transparent, ionically blocking electrode and the porous electrode, and a solid electrolyte layer, disposed between the metal oxide film and the porous electrode, to exchange oxygen ions with the metal oxide film in response to a bias voltage applied across the transparent, ionically blocking electrode and the porous electrode. The oxygen ions cause a change in a spatial distribution of mobile oxygen vacancy concentration in the metal oxide film, which, in turn, causes a change in a complex refractive index of the metal oxide film.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Figure 1A:
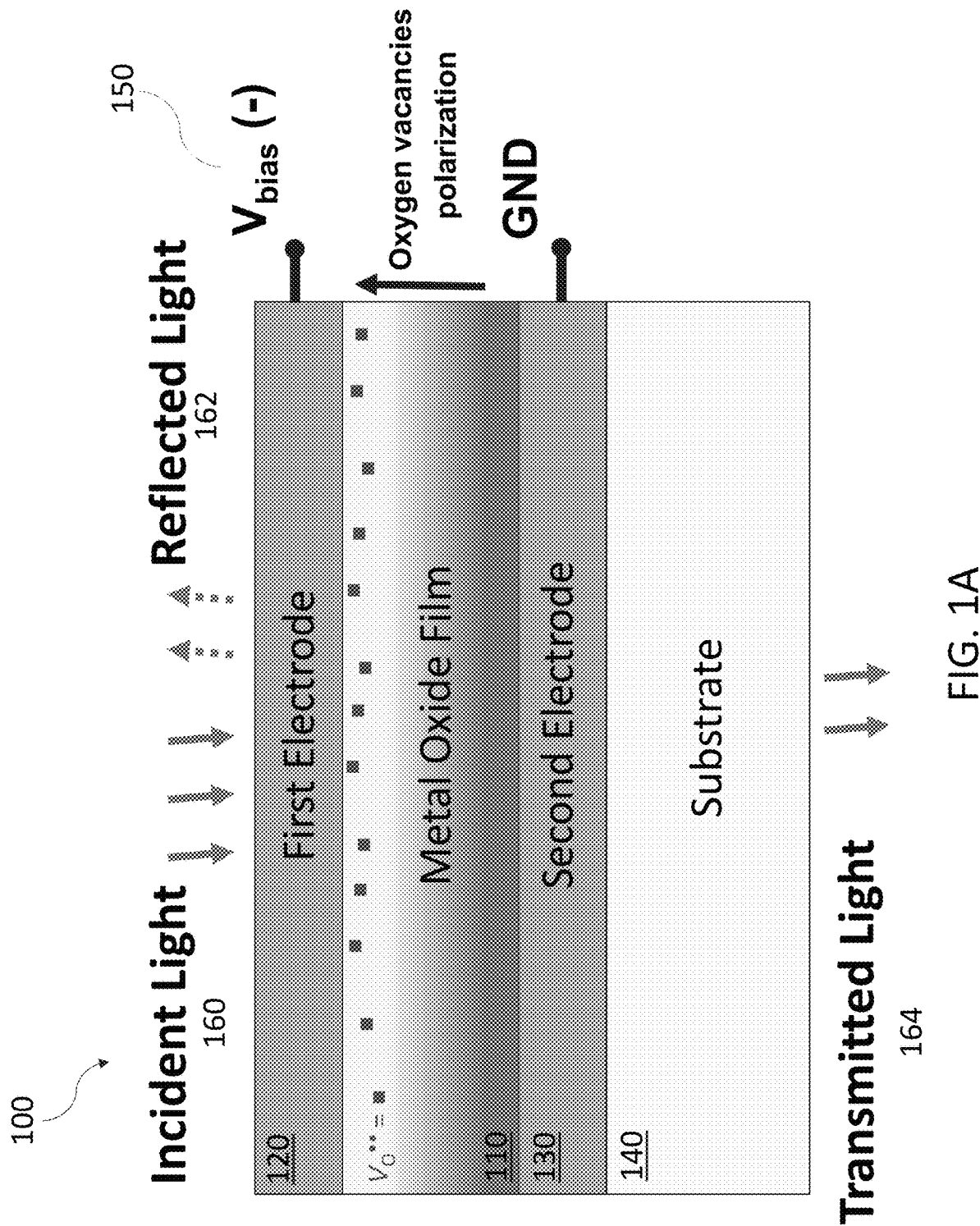
FIG. 1A shows a schematic illustration of an exemplary optical device with a metal oxide layer sandwiched between electrodes.

The reprogrammable electro-chemo-optic devices (also referred to herein as "optical device") described herein are based on the electrochemical modification of a mixed ionic-electronic conducting (MIEC) oxide, such as a metal oxide, which exhibits a complex refractive index that varies as a function of an oxygen vacancy concentration (alternatively, a function of the oxygen ion concentration) within the metal oxide film.

Compared to conventional approaches using chalcogenide materials, the MIEC oxides provide: (1) a more gradual (analog) control of the optical properties, (2) greater flexibility in tuning the operating spectral range by using different dopant ions whereas chalcogenide materials are typically limited to the infrared (IR) spectrum, (3) both volatile and non-volatile device implementation, and (4) operation over a broad temperature range from cryogenic temperatures (e.g., −196° C.) to high temperatures (e.g., about 1000° C.).

Compared to conventional approaches using intercalation of lithium, the MIEC oxides provide: (1) materials compatible for standard clean room processes (e.g., Li is not compatible), (2) greater flexibility in tuning the operating spectral bandwidth and range compared to Li-based devices, which exhibit a broader spectral response when modulating the free carrier concentration, (3) greater material selection since the optical properties of other oxide materials may be modulated by changing the free electron charge carrier density using oxygen stoichiometry control, (4) larger operating temperature range whereas Li-based devices are limited to temperatures less than 200° C., and (5) faster operating speeds enabled by local self-heating.

Various metal oxide materials may be used including, but not limited to, praseodymium-doped ceria, iron doped strontium titanate, lanthanum doped barium tin oxide, tungsten oxide, and molybdenum trioxide. In particular, praseodymium-doped ceria with the form $Pr_xCe_{1-x}O_{2-\delta}$ (PCO) has been shown to exhibit variations in the complex refractive index as a function of the oxygen vacancy concentration. Note that x refers to the Pr dopant concentration and $\delta$ is the oxygen non-stoichiometry. The Pr dopant concentration, x, may vary between about 0 and about 0.2. The oxygen non-stoichiometry, $\delta$, is typically ½ the value of $\delta$ due to charge compensation related to the valence change of the metal and change in charge due to the creation of oxygen vacancies. Additionally, different materials may have different ratios of metal to oxygen ions. For PCO, the metal:oxygen ratio is 1:2. Several exemplary designs for an optical device will be described below, which may utilize Pr-doped ceria for illustrative purposes.

For such materials, several mechanisms are available to change the oxygen vacancy concentration. In one example, a metal oxide film may be coupled to an oxygen source configured to exchange oxygen ions with the metal oxide film. If the oxygen chemical potentials of the metal oxide film and the oxygen source are different, the resultant gradient can give rise to ionic diffusion of oxygen vacancies, which can change the oxygen vacancy concentration in the metal oxide film.

In another example, the oxygen vacancies may be charged. If an electric field is applied, the oxygen vacancies may also move due to drift. For instance, a bias voltage may be applied across a metal oxide film, causing oxygen vacancies to move along a particular direction based on the orientation of the electric field.

A combination of drift and diffusion may be used to manipulate the magnitude and spatial distribution of the oxygen vacancy concentration in the metal oxide film. This can allow greater control over the oxygen vacancy concentration and the optical properties of the metal oxide film. For example, multiple electrodes may be coupled to the metal oxide film. Each electrode may supply a different bias voltage to generate an electric field pattern that changes the spatial distribution of the oxygen vacancy concentration and the complex refractive index. The bias voltage at each electrode may then be tuned to alter the spatial distribution of the oxygen vacancy concentration in a dynamic manner. Lithographic patterning may also be used to constrain the shape and dimensions of the metal oxide film and/or the electrodes. In particular, lithographic processes can be used to form sub-micron features, which can enhance the spatial resolution for manipulating the oxygen vacancy concentration.

The metal oxide may be shaped as a film to improve ease of manufacturing when using conventional deposition and/or lithography processing. However, the metal oxide may also come in other form factors (shapes and sizes). For example, the metal oxide may have form factors including, but not limited to, a wire and a particle. These other form factors may also enable additional degrees of freedom to tune the optical response of the metal oxide based on the metal oxide's size and shape. For example, nanowires and nanoparticles comparable to the wavelength of light may support Mie resonances, which can be tuned by adjusting the size and shape of the metal oxide.

The metal oxide may be tailored to operate with narrowband light (e.g., a laser, a light emitting diode) or broadband light (e.g., a lamp, an incandescent light source). The metal oxide may also be configured to operate across various spectral ranges of light including, but not limited to, ultraviolet (UV), visible light (400-700 nm) and infrared light (700 nm-12 μm). The tunability of the operating spectral range and bandwidth may be controlled, in part, by the materials used for the dopant ions, host as well as the doping level and material stoichiometry. For example, an optical device having a narrow bandwidth (e.g., less than 100 nm) may have a tunable operating wavelength controlled primarily by different doping and host materials. In another example, an optical device having a wide bandwidth, the spectral response may be controlled by the doping material, doping concentration, and the materials initial stoichiometry, which may be modulated thereafter during operation.

In some applications, a change in the optical properties of the metal oxide may be detected by measuring variations in intensity within a narrow bandwidth. For example, the transmittance of the metal oxide may change at a specific wavelength (e.g., corresponding to an operating wavelength of a laser or a light emitting diode) when a bias voltage is applied. This transmittance change can be detected using a photodetector. In some applications, the optical properties of the metal oxide may change over a broader wavelength range. For example, the color of the metal oxide may change, which can be visually detected by the human eye or using vision-based detection systems. For instance, a PCO thin film may exhibit changes in absorption at blue and green wavelengths of light, thus causing the PCO thin film to appear clear or red depending on different oxidation states.

The response time of optical devices formed from these metal oxide materials depends, in part, on the oxygen vacancy ionic mobility of the metal oxide and the geometry of the optical device (e.g., the thickness of the metal oxide film). For Pr-doped ceria, the oxygen vacancy ionic mobility is about $10^{-15}$ $cm^2V^{-1}$ $S^{-1}$ at room temperature. The slow transport kinetics at room temperature may lead to an impractically long response time for such devices (e.g., greater than 1000 s). One approach to compensate for such slow kinetics is to make the material thinner, thereby increasing the ionic conductance, which depends on both the ionic conductivity and the geometry. Another approach is to apply a higher bias voltage or decrease the oxide layer thickness in order to increase the amplitude of the electric field. A stronger electric field imparts a greater force onto the oxygen vacancies, thus increasing the transport rate.

Yet another approach is to heat the metal oxide. Typically, the ionic conductance of the metal oxide increases exponentially with higher temperatures. For example, Pr-doped ceria exhibits an oxygen vacancies ionic mobility of $10^{-10}$ $cm^2V^{-1}$ $S^{-1}$ at 100° C. and $10^{-7}$ $cm^2V^{-1}$ $S^{-1}$ at 450° C., which is 5 and 8 orders of magnitude larger compared to room temperature, respectively. The optical device may be designed to operate at these elevated temperatures at steady state so long as the other materials used in the device remain compatible in terms of mechanical integrity, electrical properties, and optical properties at elevated temperatures. Another approach is to heat the metal oxide locally fast enough to change the oxygen vacancy concentration without causing an undesirable increase in temperature elsewhere in the optical device. For example, an electrical pulse may be injected into the metal oxide, causing Joule heating at timescales on the order of nanoseconds. Similarly, a laser pulse may be used to cause heating so long as the metal oxide sufficiently absorbs the pulse.

A combination of reduced dimensions, higher bias voltages, and operation at elevated temperatures may enable such metal oxide materials to have a faster response time. For example, a 100 nm thick metal oxide film at 100° C. typically has a full response time (e.g., the largest measurable change in optical properties) of about 100 ms and a partial response time (e.g., the smallest measurable change in optical properties) of about 1 ms. As described above, the oxygen vacancy ionic mobility changes exponentially as a function of temperature. Thus, higher operation temperatures may exponentially reduce the response time to less than 100 ns.

An Exemplary Optical Device Using a Voltage Induced Oxygen Vacancy Polarization

FIG. 1A shows an exemplary optical device 100 with optical properties (e.g., transmittance, absorbance, or reflectance) that change (e.g., increase or decrease) due to a voltage induced oxygen vacancy polarization. As shown, the optical device 100 includes a metal oxide film 110 with a complex refractive index that varies as a function of a mobile oxygen vacancy concentration. The metal oxide film 110 is disposed between a first electrode 120 and a second electrode 130. A voltage source 150 is coupled to the first electrode 120 and the second electrode 130 and used to apply a voltage bias across the metal oxide film 110. A substrate 140 may be used to mechanically support the metal oxide film 110, the first electrode 120, and the second electrode 130 during fabrication and operation.

The optical device 100 may be configured to have a substantially uniform oxygen vacancy concentration distribution in the metal oxide film 100 when no bias voltage is applied (e.g., $V_{bias}=0$ V). Thus, the complex refractive index (e.g., both the refractive index and extinction coefficient of the metal oxide film 110) may also be substantially uniform.

When a bias voltage is applied, the electric field that arises from the bias voltage may cause the oxygen vacancies within the metal oxide film 110 to drift towards a particular region of the metal oxide film 110. The region in the metal oxide film 110 that the oxygen vacancies drift towards depends, in part, on the polarity and orientation of the electric field. For example, if a negative bias voltage is applied (e.g., the voltage at the first electrode 120 is negative and the second electrode 130 is connected to ground), oxygen vacancies in the metal oxide film 110 may move towards the first electrode 120. If a positive bias voltage is instead applied to the first electrode 120, the oxygen vacancies in the metal oxide film 110 may move towards the second electrode 130.

If the first electrode 120 and the second electrode 130 are substantially ion-blocking (e.g., having an ionic conductance 1000 times lower than the oxide layer), the oxygen vacancies within the metal oxide film 110 may accumulate thus forming a gradient in the oxygen vacancy concentration where one region in the metal oxide film 110 has an oxygen vacancy concentration substantially greater than another region in the metal oxide film 110. For example, the ratio of the oxygen vacancy concentration between two different regions of the metal oxide film 110 may vary between about $10^{-20}$ $cm^{-3}$ and about $10^{20}$ $cm^{-3}$. This gradient in the oxygen vacancy concentration may, in turn, induce an oxygen vacancy polarization resulting in a corresponding gradient in the complex refractive index of the metal oxide film 110 to form. When the complex refractive index changes in this manner, the optical properties of the optical device 100 may also change.

Generally, at least one of the electrodes in the optical device 100 should be ion blocking. The limitations on the ion-blocking electrodes are twofold. First, the electrode should allow polarization and/or pumping of the oxygen vacancies inside the metal oxide film 110. This may be achieved if the electrode has an ionic mobility at least one order of magnitude lower than the metal oxide film at the same temperature and operating conditions. Second, the electrode should allow the optical device 100 to store oxygen inside the device over time to prevent degradation and/or non-volatility. This latter limitation may be met if the electrode has an ionic mobility several orders of magnitude (e.g., at least 3 orders of magnitude) lower than the metal oxide film 110, which may be achieved, for example, by making the electrodes thicker.

Depending on the configuration of the optical device 100, the change in the optical properties of the metal oxide film 110 may correspond to an increase or decrease in at least the transmittance, absorbance, or reflectance of the optical device 100. For example, the metal oxide film 110 may be substantially transparent (e.g., having a transmittance more than 80%) under zero bias voltage. When a bias voltage is applied to the first electrode 120, the resulting oxygen vacancy polarization may cause an increase in optical loss (a higher overall extinction coefficient) and/or a change in refractive index that increases the optical impedance with the first electrode 120 and the second electrode 130, increasing the reflectivity and/or absorptivity of the optical device 100. If the first electrode 120, the second electrode 130, and the substrate 140 are substantially transparent (e.g., having a transmittance greater than 85%), then the proportion of incident light 160 that is transmitted through the optical device 100 (i.e., transmitted light 164) may be significantly less than the proportion of incident light 160 reflected (i.e., reflected light 162) and absorbed by the optical device 100. In this manner, the optical device 100 may transition between being substantially transparent to being substantially opaque. In another example, the inverse response may occur (e.g., the optical device 100 transition from being substantially opaque to being substantially transparent under the same bias voltage). For instance, a PCO metal oxide film 110 may be quenched to be in an oxidation state such that the metal oxide film 110 is initially opaque. As the metal oxide film 110 becomes progressively more polarized where the oxygen vacancy concentration increases higher on one side than the other, the metal oxide film 110 may become more transparent.

The transient response of the optical device 100 when the bias voltage is applied may depend, in part, on the material used to form the metal oxide film 110 and the structure of the optical device 100. For some materials, the complex refractive index of the metal oxide film 110 may change in a substantially continuous and smooth manner as the oxygen vacancies drift in the metal oxide film 110 and an oxygen vacancy polarization is induced. This may lead to a corresponding continuous, smooth transition in the optical properties of the optical device 100. For other materials, the complex refractive index of the metal oxide film 110 may change in a discontinuous manner. For example, the metal oxide film 110 may have a complex refractive index that changes only when the oxygen vacancy concentration is above or below a threshold in the oxygen vacancy concentration, thus forming a binary switch.

The change in the optical properties of the optical device 100 may also depend on the structural design of the optical device 100. For example, the optical device 100 may be structured to support an optical resonance (e.g., a Fabry-Pérot resonance) that transmits, reflects, or absorbs light at a particular wavelength when the resonance is excited. The quality factor and/or the resonance frequency of the optical resonance may be sensitive to the complex refractive index of the metal oxide film 110. Changes to the complex refractive index may thus cause the optical resonance to shift in frequency and/or broaden/narrow in bandwidth, which may affect the magnitude of change in the optical properties of the optical device 100 as well as the transient response.

If the ionic mobility of the metal oxide film 110 is high enough (e.g., greater than $10^{-10}$ cm$^2$V$^{-1}$S$^{-1}$ at a temperature at least 100° C.), the optical properties of the metal oxide film 110 (e.g., thickness of 100 nm) may change quickly (e.g., in less than 100 ms). Since the oxygen vacancies are mobile, once the voltage bias is removed, the oxygen vacancies accumulated in one region of the metal oxide film 110 will diffuse, in an ambipolar manner, such that the oxygen vacancy concentration becomes substantially uniform within the metal oxide film 110.

This process may be accelerated by applying a bias voltage with opposite polarity. Switching the polarity of the bias voltage speeds up transport of the oxygen vacancies (e.g., due to drift) in the opposite to the polarized state direction. In this manner, the change in optical properties of the optical device 100 may be volatile where electrical power of the same polarity should be continuously supplied to maintain desired optical properties of the optical device 100 (e.g., keeping the optical device 100 non transparent).

As described above, the ionic conductance of the metal oxide film 110 may vary substantially with temperature. This temperature dependency may thus be used in some applications to enable the optical device 100 to operate in a non-volatile manner. In one exemplary use case, the optical device 100 may operate as follows: (1) the optical device 100 may initially be at a lower temperature (e.g., room temperature) such that the ionic conductance is less than $10^{-15}$ cm$^2$/V/s, thus preventing any changes to the optical properties of the optical device 100 when a voltage bias is applied. (2) A heater, operably coupled to the optical device 100, (or a joule self-heating effect) may be used to raise the temperature of the metal oxide film 110 such that oxygen vacancies can readily move within a shorter timescale (e.g., on a time scale of 1 ns). (3) Once the temperature of the metal oxide film 110 reaches a target or threshold temperature (typically above 500° C.), a voltage bias is then applied to induce an oxygen vacancy polarization in the metal oxide film 110. (4) Once the optical properties have sufficiently changed, the heater may be turned off and the optical device 100 cooled to a lower temperature, thus reducing the ionic conductance and preventing the optical device 100 from returning to its original state. (5) Then, the voltage bias may be removed. A similar process may be used to return the optical device 100 back to its original state (e.g., transitioning from having an induced oxygen vacancy polarization to having no oxygen vacancy polarization) by applying a zero bias voltage or a bias voltage with opposite polarity in step (3). In designs where the metal oxide film 110 is formed from a PCO film, the temperature of the PCO film may vary between about −196° C. (e.g., liquid nitrogen temperatures, or cryogenic temperature) and about 1000° C. Additionally, the optical device 100 may include an integrated heater configured to provide distributed heating across the metal oxide film 110. FIG. 1C shows an exemplary heater 180 formed using a titanium (Ti) and platinum (Pt) heating electrode 184 that may be formed on the backside of the substrate 140 with contact pads 186. The Ti layer is used, in part, as an adhesion layer for the Pt. As shown, the Ti and Pt electrode 184 is patterned to be serpentine in shape in order to increase the electrical resistance and, thus, provide greater Joule heating via current run through the contact pads 186. To accelerate cooling of the optical device 100, the optical device 100 may be coupled to a heat sink or an active cooling apparatus (e.g., a Peltier cooler).

The first electrode 120 and the second electrode 130 may be substantially ion blocking as described above. This may be accomplished by controlling the porosity and/or density of the first electrode 120 and the second electrode 130 during deposition. This allows the optical device 100 to operate as a closed system (e.g., no electrochemical interactions occur between the optical device 100 and the environment), which can enable more reliable, repeatable performance since the optical device 100 is not sensitive to varying environmental conditions. Separate ion-blocking layers (e.g., having an ionic conductance less by at least one order of magnitude than the oxide layer 110) may also be incorporated into the optical device 100 such that neither the first electrode 120 nor the second electrode 130 have to be ion-blocking while still maintaining a close system. In this manner, design constraints on the first electrode 120 and the second electrode 130 may be more lenient.

In some designs, the optical device 100 may instead be a substantially open system (e.g., the first electrode 120 and/or the second electrode 130 are not ion-blocking). For such designs, an oxygen vacancy polarization may still be induced in the metal oxide film 110 so long as the transport rates of oxygen vacancies in the metal oxide film 110 are considerably faster than the rate at which oxygen vacancies move into or out of the device through electrodes 120 and 130. As described above, the transport of oxygen vacancies may be caused by diffusion (e.g., a concentration gradient) and/or drift (e.g., an applied electric field).

In one example, the ionic conductance of the metal oxide film 110 may be larger than the first electrode 120 and the second electrode 130. When a bias voltage is first applied, the transport rate of oxygen vacancies in the metal oxide film 110 may be larger than the transport rate of oxygen vacancies entering/leaving the metal oxide film 110 through the first electrode 120 and/or the second electrode 130. In order to balance these rates, a gradient in the oxygen vacancy concentration may arise within the metal oxide film 110. The magnitude of the bias voltage may be tuned to change the shape of the oxygen vacancy concentration gradient and/or the ratio of the oxygen vacancy concentration between two different regions of the metal oxide film 110. The ionic conductance of the first electrode 120 may also be different from the second electrode 130, resulting in different transport rates of oxygen vacancies (or oxygen ions) through the first electrode 120 and the second electrode 130, respectively. This difference in transport rates introduces an asymmetry in the optical device 100 that may also be used to further induce a gradient in the oxygen vacancy concentration in the metal oxide film 110.

The first electrode 120 and/or the second electrode 130 may be substantially transparent at the operating wavelength (s) of the optical device 100. The first electrode 120 and/or the second electrode 130 may also be electrically conducting to electrically couple the metal oxide film 110 to the voltage supply 150. Additionally, the first electrode 120 and the second electrode 130 may have a thickness and/or density tailored to meet a desired ionic conductance. For example, the first electrode 120/second electrode 130 may be thicker or less porous in order to reduce the ionic conductance and, hence, making the first electrode 120 and/or second electrode 130 ion blocking. The first electrode 120 and/or the second electrode 130 may be formed from indium-doped tin oxide (ITO), fluorine-doped tin oxide (FTO), aluminum-doped zinc oxide (AZO), doped silicon, graphene or any other suitable transparent electric conductors that are also poor oxygen ion conductors known to one of ordinary skill in the art. Additionally, the first electrode 120 and/or the second electrode 130 may be formed from materials including gold, silver, or aluminum with a film thickness substantially less than the optical penetration depth of these materials. The first electrode 120 and the second electrode 130 may also be sufficiently nonporous to limit oxygen from entering the metal oxide film 110 from the atmosphere through the electrode. Such atmospheric oxygen may be annihilate oxygen vacancies near the negative electrode in the optical device 100. The first electrode 120 and the second electrode 130 may also be formed from material having a melting point temperature sufficiently higher than the operating temperatures of the optical device 100 such that the desired electrical and optical properties are maintained at the operating temperature.

For the design of optical device 100, the metal oxide film 110 may vary in thickness between about 1 nm to about 1000 nm. The metal oxide film 110 may be formed from various metal oxide materials including, but not limited to, praseodymium-doped ceria or molybdenum trioxide.

The substrate 140 may also be thick enough to support the other constituent layers in the optical device 100 during manufacture and handling. For example, the substrate 140 may have a thickness ranging between about 0.01 mm to about 1 mm. The substrate 140 may also be formed from a transparent material including, but not limited to silicon oxide, soda lime glass, borosilicate glass, yttrium stabilized zirconia (YSZ), sapphire, or any other transparent materials. In applications where the optical device 100 transition between being substantially absorptive to substantially reflective, the substrate 140 may instead be formed from materials opaque at the desired operating wavelength. These materials include, but are not limited to, silicon, silicon carbide, or other compatible substrate materials. The substrate 140 may also have a melting point temperature sufficiently higher than the operating temperatures of the optical device 100 such that the substrate 140 maintains structural integrity and the desired ionic and optical properties at the operating temperature.

Figure 1B:
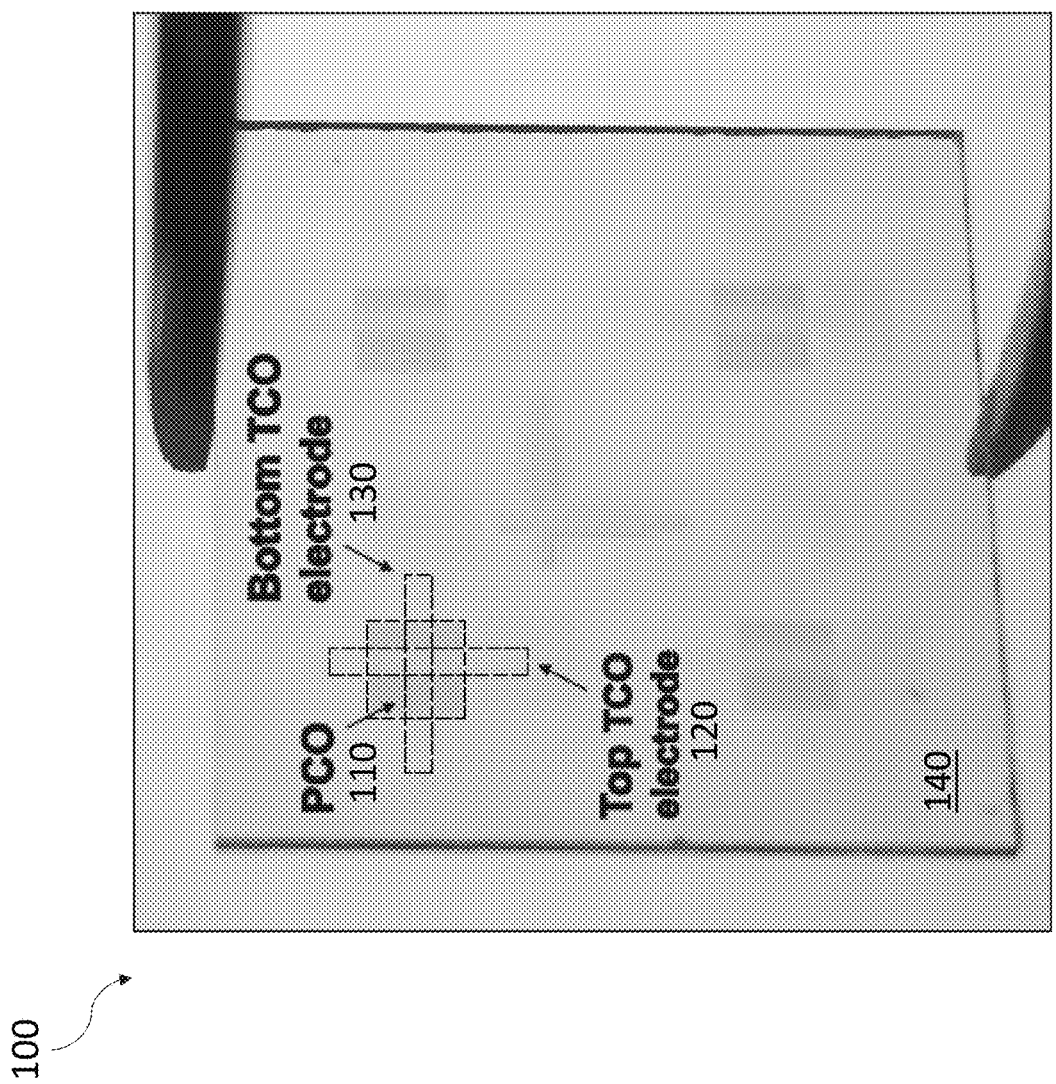
FIG. 1B shows an image of an optical device based on the design shown in FIG. 1A.
Figure 1C:
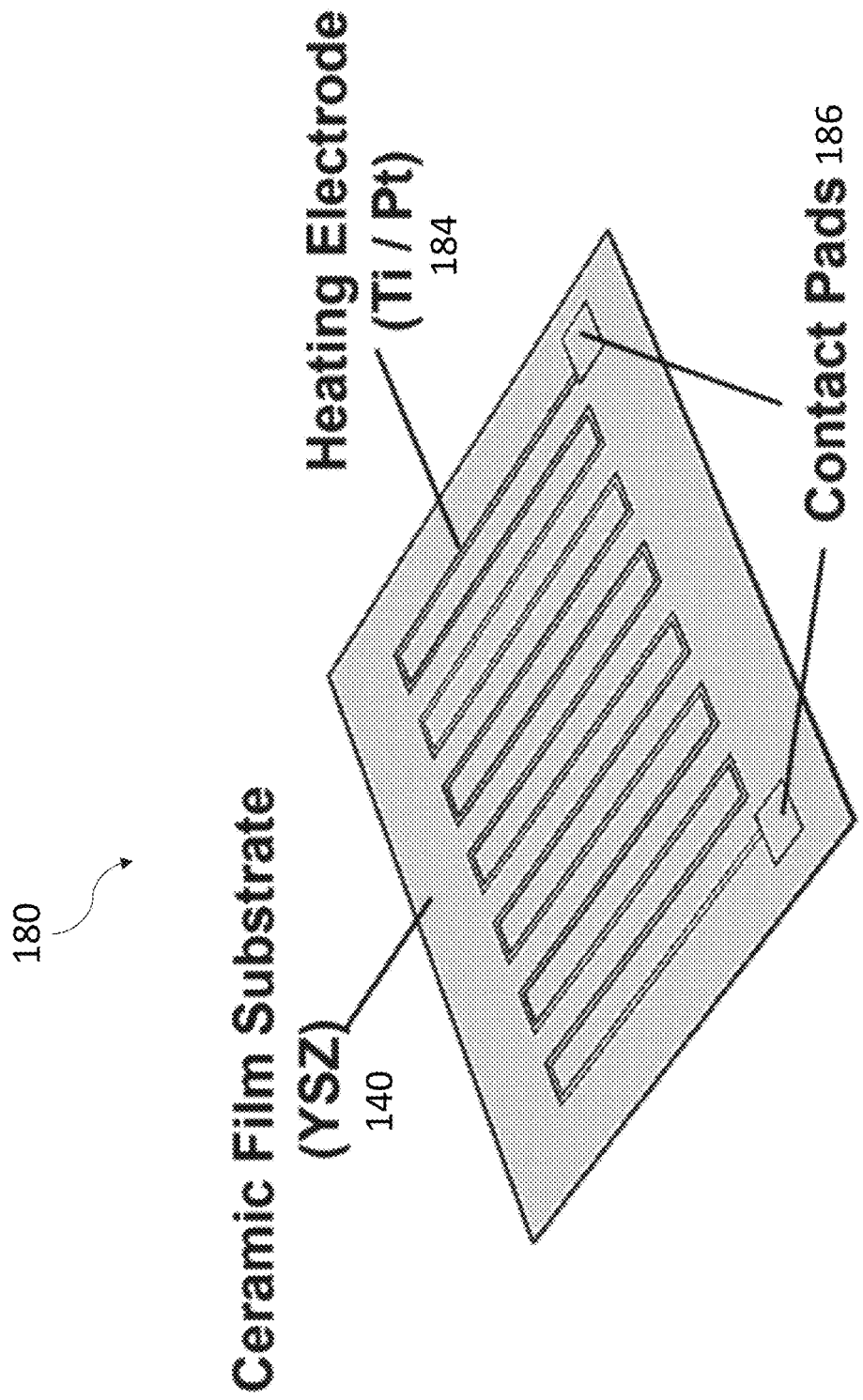
FIG. 1C shows an exemplary heater, which may be integrated with the optical device of FIG. 1A to heat the metal oxide film.

FIG. 1B is a photograph of the optical device 100. For this optical device 100, the metal oxide film 110 is formed from PCO. The first electrode 120 and the second electrode 130 are both formed from a transparent conducting oxide (TCO), such as ITO. The optical device 100 is fabricated on a sapphire substrate 140. As shown, the first electrode 120 and the second electrode 130 may be shaped as strips that partially cover the metal oxide film 110. The region first electrode 120 and the second electrode 130 overlap to define the region where the optical properties of the optical device 100 change when a bias voltage is applied.

An Exemplary Optical Device Using Electrochemical Oxygen Pumping

Figure 2A:
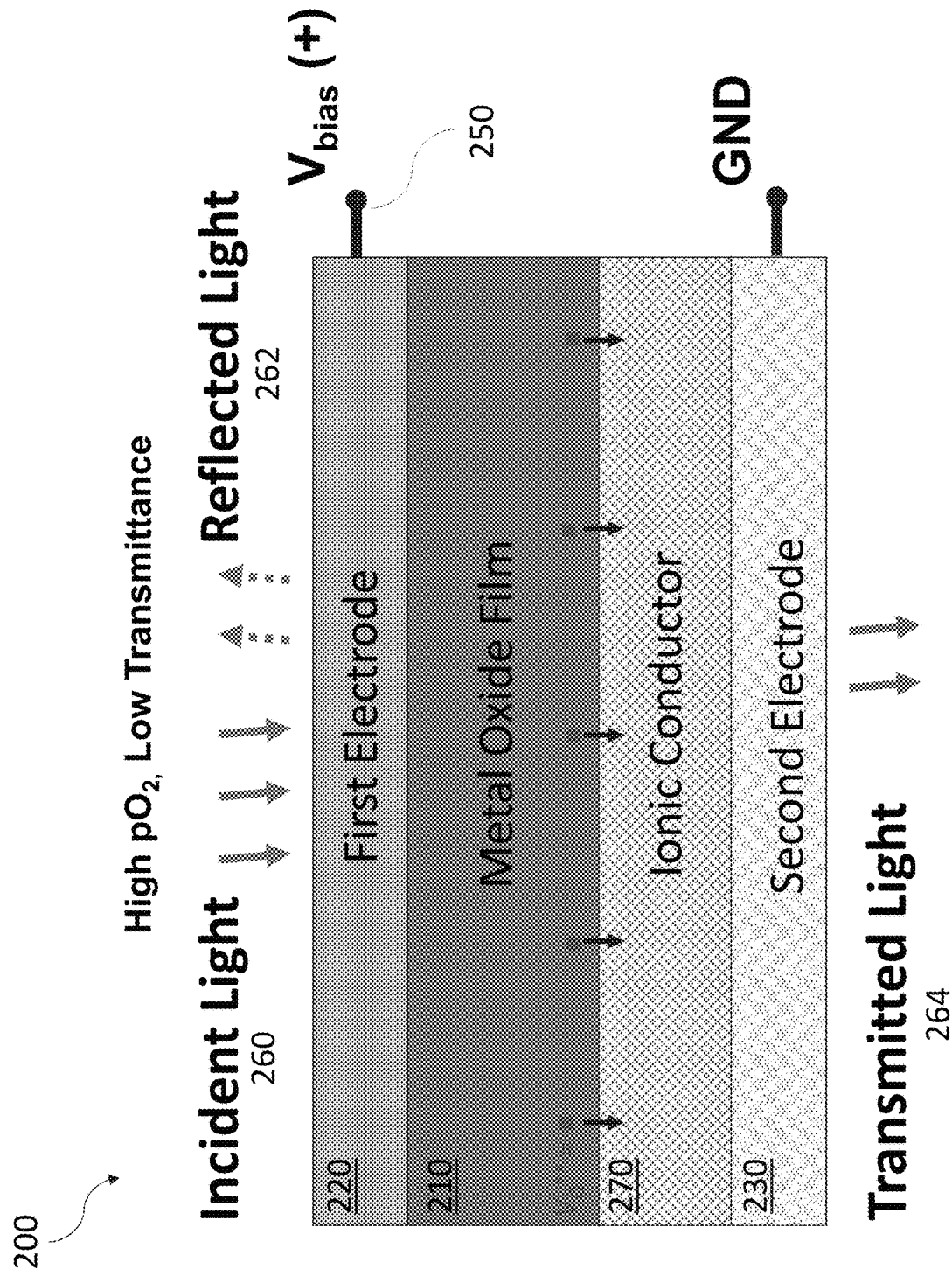
FIG. 2A shows a schematic illustration of an exemplary optical device with a metal oxide layer and an ionic conductor sandwiched between electrodes in a low transmittance state.
Figure 2B:
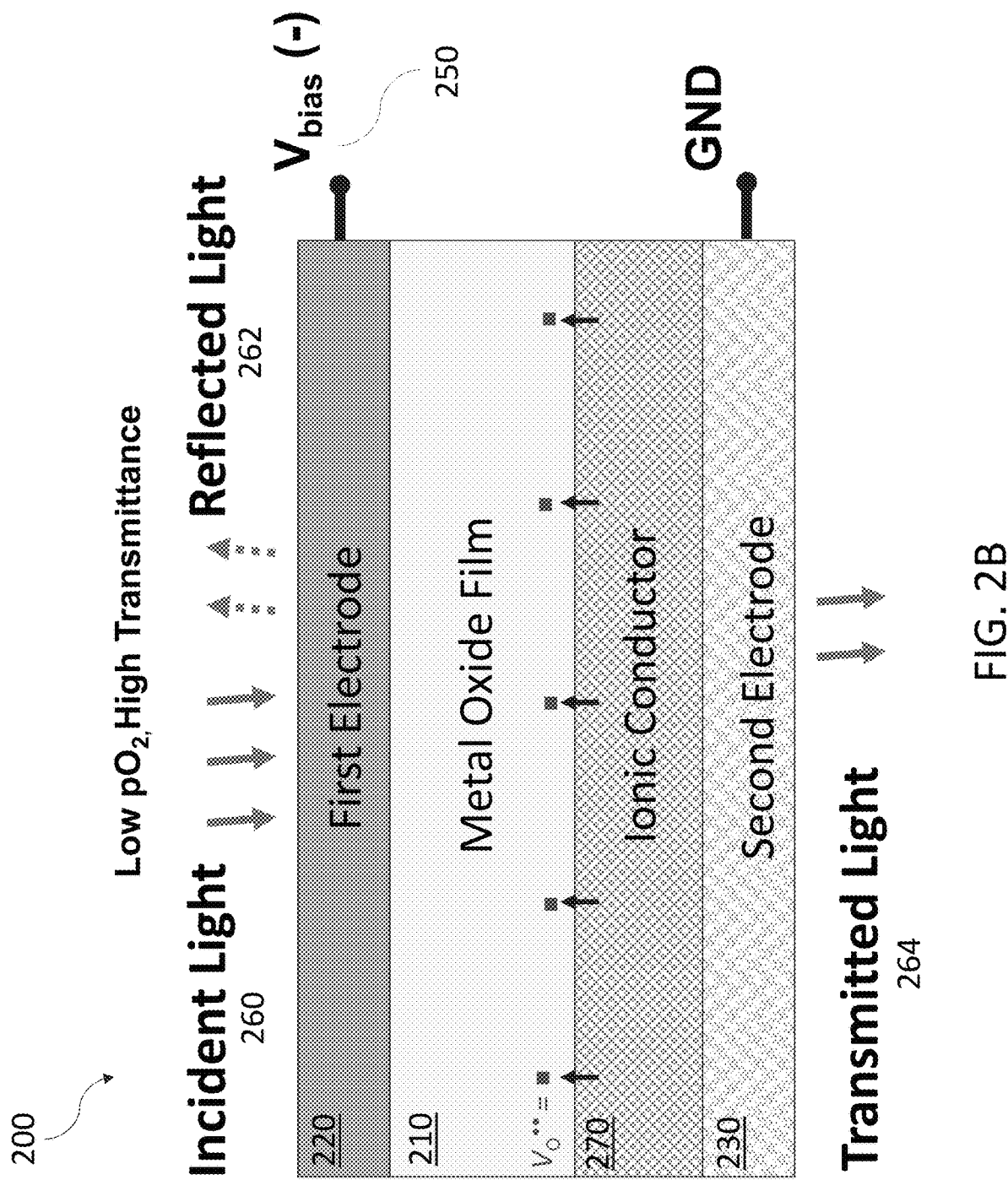
FIG. 2B shows a schematic illustration of the exemplary optical device of FIG. 2A in a high transmittance state.

FIGS. 2A and 2B show an exemplary optical device 200 with optical properties (e.g., the transmittance, absorbance, or reflectance) that change due to the electrochemical pumping of oxygen from an oxygen source into and out of a metal oxide film 210 with a complex refractive index that varies as a function of a mobile oxygen vacancy concentration. The metal oxide film 210 may be disposed onto an ionic conductor 270, which also functions as a substrate. The ionic conductor 270 may also be used to transport ions to/from the metal oxide film 210. The metal oxide film 210 and the ionic conductor 270 may be disposed between a first electrode 220 and a second electrode 230. The first electrode 220 may be ion-blocking to oxygen and the second electrode 230 may provide oxygen transport. The second electrode 230 may be formed from a non-porous or porous MIEC or porous metal including, but not limited to, platinum, nickel, gold. A voltage source 250 may be coupled to the first electrode 220 and the second electrode 230 and used to supply a bias voltage across the metal oxide film 210 and the ionic conductor 270. The oxygen source may be oxygen gas in an environment or oxygen stored in a layer (e.g., a solid mixed ionic-electronic conductor thin film) coupled to the metal oxide film.

When a bias voltage is applied using the voltage source 250, an electric field arises in the ionic conductor 270 that causes oxygen ions/oxygen vacancies to move between the metal oxide film 210 and the oxygen source, thus changing the complex refractive index of the metal oxide film 210. In contrast to the optical device 100, the change in optical properties of the optical device 200 is primarily driven by a change in the magnitude of the oxygen vacancy concentration, which may remain substantially uniform at steady state. As before, the change in optical properties may be affected by both the material used to form the metal oxide film 210 and the structure of the optical device 200.

FIGS. 2A and 2B show one exemplary design where the optical device 200 is configured to switch between being substantially opaque (e.g., a transmittance less than 30%) to being substantially transparent (e.g., a transmittance greater than 80%) at a particular wavelength or wavelength range. Here, the ionic conductor 270 and the second electrode 230 are ionically conducting (e.g., having an ionic conductance greater than $10^{-5}$ S) while the first electrode 220 is ionically blocking (e.g., having an oxygen ionic conductance less than $10^{-8}$ S). Thus, the exchange of oxygen ions/oxygen vacancies between the metal oxide film 210 and the oxygen source occurs through the ionic conductor 270 and the second electrode 230. Additionally, the first electrode 220, the second electrode 230, and the ionic conductor 270 may also be substantially transparent at the operating wavelength.

FIG. 2A shows the optical device 200 in a low transmittance state. A positive bias voltage (the bias voltage being defined in reference to the first electrode 220) is applied, which generates an electric field that causes oxygen ions to be pumped into the metal oxide film 210 and, correspondingly, oxygen vacancies to be pumped out of the metal oxide film 210 through the ionic conductor 270. The reduction in the oxygen vacancy concentration changes the complex refractive index of the metal oxide film 210 such that the optical device 200 becomes more absorptive, and thus more opaque (i.e., less transparent).

FIG. 2B shows the reverse process where a negative bias voltage is applied, causing oxygen ions to be pumped out of the metal oxide film 210 and oxygen vacancies to be pumped into the metal oxide film 210 through the ionic conductor 270. The oxygen vacancy concentration in the metal oxide film 210 thus increases, resulting in a change in the complex refractive index that increases the transmittance of the optical device 200. The processes depicted in FIGS. 2A and 2B allow the optical device 200 to be electrically switched between two optical states (e.g., high transmittance, low transmittance). The optical states shown in FIGS. 2A and 2B are reversible so long as the applied bias voltage does not exceed the breakdown voltage of the various films in the optical device 100 and/or induce decomposition of said films. For some materials, the switching of the optical device 200 may occur in an analog fashion where the optical properties continuously change as the oxygen vacancy concentration changes.

For the optical device 200 shown in FIGS. 2A and 2B, the second electrode 230 may be ionically conducting in order to allow the exchange of oxygen ions/oxygen vacancies between the metal oxide film 210 and the oxygen source. In some designs, the second electrode 230 may be a MIEC, which allows gas phase reactions to occur on the surface of the second electrode 230 exposed to the environment. The gas phase reactions produce ions, which may then transport towards the ionic conductor 270 through the MIEC second electrode 230. In some designs, the optical device 200 may include an oxygen storage layer as the oxygen source. In this case, no gas phase reactions occur, but rather oxygen in the form of a gas or a solid may be stored and releases by the oxygen storage layer. The oxygen storage material may also be formed from a MIEC. For example, the second electrode 230 may be formed from a PCO film with sufficient thickness such that the PCO film may function as both an electrode and an oxygen storage material. For this case, the first electrode 220 and the second electrode 230 may both be ionically blocking. The use of the oxygen storage layer is discussed in more detail below. Additionally, the optical device 200 may be configured to be volatile or non-volatile, depending on the manner in which the first electrode 220 and the second electrode 230 are electrically coupled.

For example, for the volatile case, the bias voltage may be set to zero and the first electrode 220 can be short-circuited to the second electrode 230. Under these conditions, electron and oxygen ion transport can occur within the optical device 200, causing the oxygen vacancy concentration in the metal oxide film 210 to change in order to balance transport rates with the oxygen source. This oxygen vacancy concentration may depend primarily on the equilibrium established between the optical device 200 and the oxygen source under zero bias voltage.

In another example, for the non-volatile case, the first electrode 220 and the second electrode 230 form an open circuit. In this case, electron and oxygen ion transport through the optical device 200 is prevented due to the open-circuit. Thus, once the optical properties of the optical device 200 are changed and an open-circuit is introduced, the optical properties may be maintained even when the voltage bias is removed. This enables non-volatile operation of the optical device 200.

As described above, the optical device 200 may also be configured to operate at an elevated temperature in order to increase the ionic conductance of the metal oxide film 210. This allows the optical properties of the optical device 200 to change within a practical timescale (e.g., less than 1 s). The optical device 200 may be coupled to a heater, such as the heater 180 shown in FIG. 1C, that raises the temperature of the metal oxide film 210 when a change in the optical properties of the optical device 200 is desired. Additionally, the optical device 200 may be coupled to a heat sink or an active cooling apparatus (e.g., a Peltier cooler) to accelerate cooling. For some designs, the optical device 200 may be kept at the elevated temperature during operation. In other designs, the optical device 200 may only be heated when a change is desired, providing another mechanism to enable non-volatile operation of the optical device 200.

The optical device 200 may be used as follows: (1) the optical device 200 may initially be at a lower temperature (e.g., room temperature). (2) A heater, operably coupled to the optical device 100, may be used to raise the temperature of the metal oxide film 210 such that oxygen vacancies can readily move. (3) Once the temperature of the metal oxide film 110 increases, a voltage bias is then applied to change the oxygen vacancy concentration through the exchange of oxygen ions between the metal oxide film 210 and the oxygen source. (4) Once the optical properties have sufficiently changed, the bias voltage may be removed and the optical device 200 may be switched to operate in as an open-circuit in order to retain the optical properties. (5) The heater may be turned off and the optical device 100 cooled to a lower temperature. A similar process may be used to reverse the change in optical properties by applying a bias voltage with opposite polarity in step (3). In designs where the metal oxide film 210 is formed from a PCO film, the temperature of the PCO film may vary from about −196° C. and up to 1000° C.

Figure 2C:
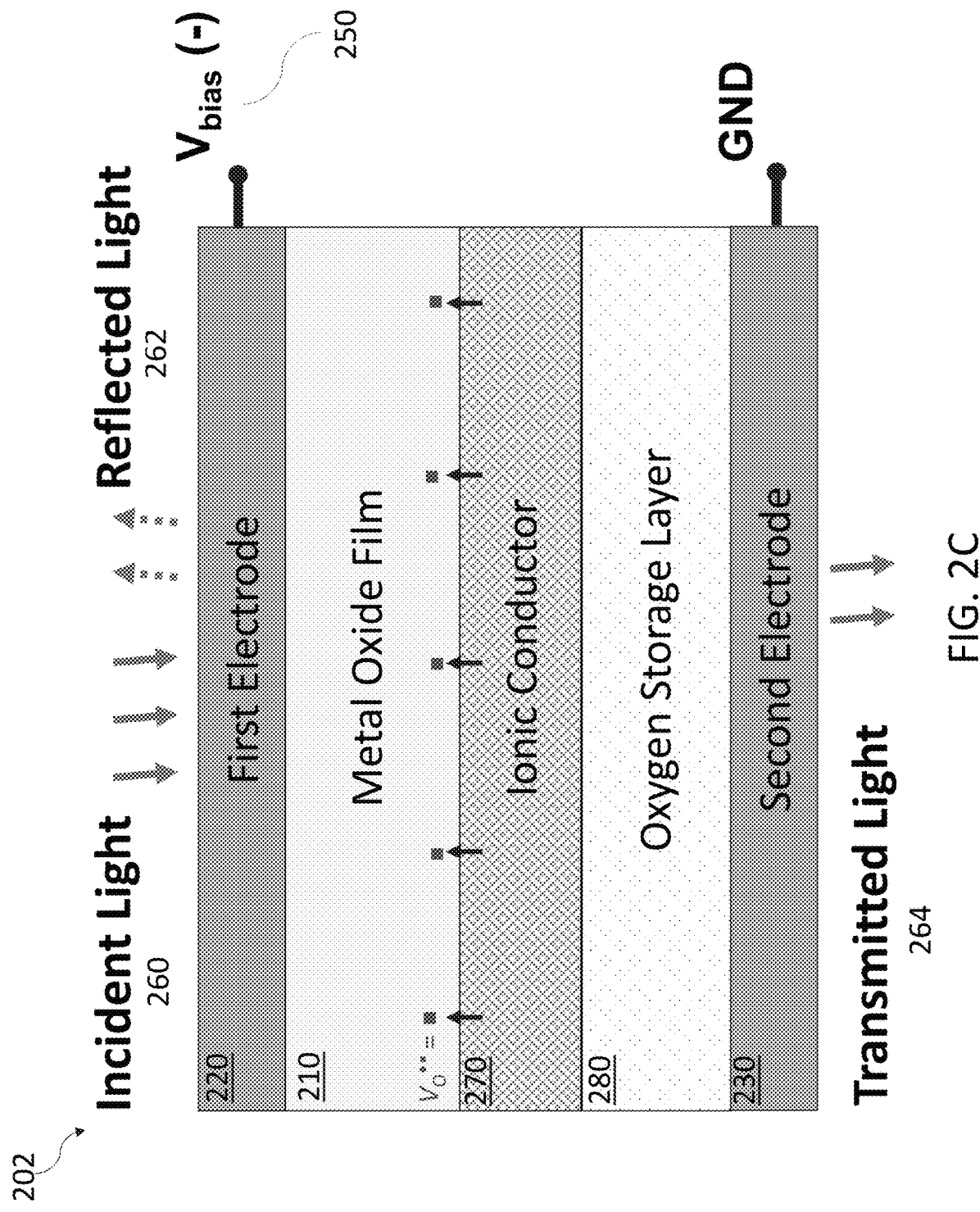
FIG. 2C shows a schematic illustration of an exemplary optical device based on FIG. 2A with an oxygen storage layer in the high transmittance state.

In some designs, the oxygen source may be an oxygen containing environment that surrounds the optical device 200. In other designs, an oxygen storage layer may be integrated into the optical device 200. For example, FIG. 2C shows an exemplary optical device 202 with an oxygen storage layer 280 disposed between the ionic conductor 270 and the second electrode 230. For this exemplary design, the second electrode 230 may also be ion-blocking to oxygen. Additionally, the ionic conductor 270 may be made very thin in the optical device 202 shown in FIG. 2C in order to enable faster operation and/or lower operating temperatures.

The oxygen storage layer 280 is typically electrically conducting or mixed ionic and electrically conducting (and is thus ineffective as an electrolyte) and is able to have an oxygen concentration that changes under an applied bias. This is in contrast to the ionic conductor 270, which should be ionically conducting and electrically insulating. The use of the oxygen storage layer 280 can allow the optical device 200 to function as a closed system, thus removing possibility variability in performance that may arise due to variability in the surrounding environment. The oxygen storage layer 280 may be formed from various materials able to reversibly gain or lose oxygen including, but not limited to, a single phase material, such as $Pr_{1-x}Ce_xO_{2-\delta}$ and $Sr(Ti_{1-x}Fe_x)O_{3-\delta}$ where δ can be relatively large, a two phase material, such as Ni/NiO and Pd/PdO, a MIEC oxide, such as $MoO_{3-x}$, $WO_3$, or any other known materials meeting the desired properties described above.

The ionic conductor 270 may also function as a substrate to mechanically support the various components of the optical device 200 during manufacture and handling and to facilitate the exchange of oxygen ions between the metal oxide film 210 and the oxygen source. For example, the ionic conductor 270 may be in the form of a wafer with a thickness between about 0.01 mm and about 0.5 mm. The ionic conductor 270 may be formed from various materials including, but not limited to, yttria stabilized zirconia (YSZ), gadolinium doped ceria (GDC), lanthanum strontium gallium magnesium oxide (LSGM), or any other compatible ionically conducting substrate materials. The ionic conductor 270 may also be formed from a material having a melting point sufficiently higher than the operating temperatures of the optical device 200 such that the ionic conductor 270 maintains structural integrity and the desired ionic and optical properties.

The metal oxide film 210 may have a thickness of about 1 nm to about 1000 nm. The metal oxide film 210 may be formed from various rare-earth, transition metal, and other oxide materials including, but not limited to, praseodymium-doped ceria, iron doped strontium titanate, lanthanum doped barium tin oxide, tungsten oxide or molybdenum oxide.

The first electrode 220 and/or the second electrode 230 may be substantially transparent at the operating wavelength (s) of the optical device 200. The first electrode 220 and/or the second electrode 230 may also be electrically conducting to electrically couple the metal oxide film 210 to the voltage supply 250. The first electrode 220 and the second electrode 230 may also be shaped and dimensioned to support a desired ionic conductance. For example, the first electrode 220 may be substantially thicker than the second electrode 230 such that the first electrode 220 is ionically blocking (e.g., having an ionic conductance of less than $10^{-8}$ S) while the second electrode 230 is ionically conducting (e.g., having an ionic conductance greater than $10^{-5}$ S). In one example, the first electrode 220 may have a thickness ranging between about 20 nm to about 100 nm. Depending on the desired optical properties of the optical device 200, the first electrode 220 and the second electrode 230 may be formed from various electrically conducting materials including, but not limited to, indium-doped tin oxide (ITO), fluorine-doped tin oxide (FTO), aluminum-doped zinc oxide (AZO), doped silicon, graphene, gold, silver, or aluminum. In some designs, the first electrode 220 and/or the second electrode 230 may be thin enough to be transparent or translucent, even if made from a material like gold or silver. The first electrode 220 and the second electrode 230 may also be formed from materials having a melting point temperature sufficiently higher than the operating temperatures of the optical device 200 such that the desired electrical and optical properties are maintained at the operating temperature.

An Exemplary Optical Device Using Atmospheric Partial Pressure of Oxygen

Figure 3A:
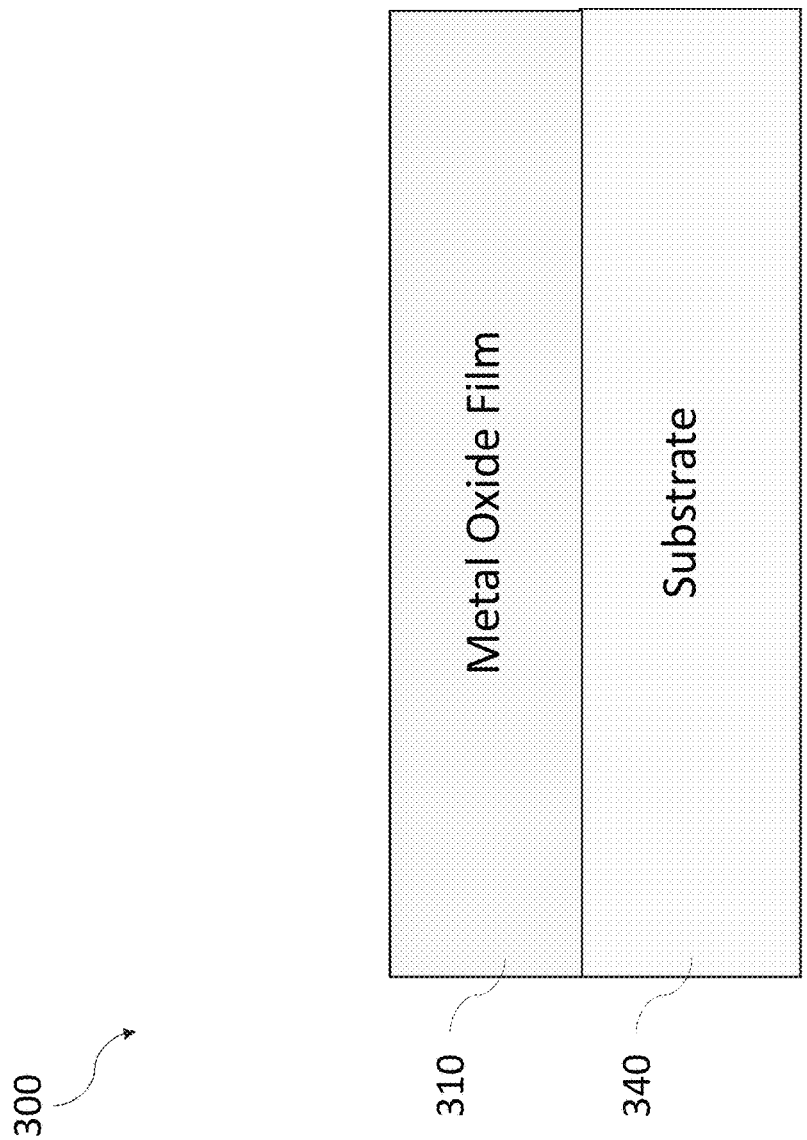
FIG. 3A shows a schematic illustration of a passive optical device with a metal oxide layer on a substrate.

FIG. 3A shows an exemplary optical device 300 with optical properties (e.g., the transmittance, absorbance, or reflectance) that change in a passive manner (e.g., without electrical actuation) in response to variations in the atmospheric partial pressure of oxygen. As shown, the optical device 300 includes a metal oxide film 310 disposed onto a substrate 340. The metal oxide film 310 can be lithographically patterned to form optical devices based on spatial variations of the complex refractive index (e.g., Fresnel lens with an adaptive focus). The substrate 340 may be used to mechanically support the metal oxide film 310 during manufacture and operation.

The optical device 300 does not include any electrodes. Rather, the metal oxide film 310 is exposed, at least on one side, to the surrounding environment. When the atmospheric partial pressure of oxygen increases/decreases, the oxygen vacancy concentration in the metal oxide film 310 changes as well due to oxygen ion transport between the metal oxide film 310 and the surrounding environment. As in the optical devices described above, a change in the oxygen vacancy concentration results in a change in the complex refractive index of the metal oxide film 310. Depending on the material used to form the metal oxide film 310 and the structure of the optical device 300, a change in the complex refractive index of the metal oxide film 310 may lead to an increase/decrease in the transmittance, absorbance, and/or reflectance.

When a sudden change in the atmospheric partial pressure of oxygen occurs, a gradient in the oxygen vacancy concentration in the metal oxide film 310 may initially form due to the oxygen vacancies' transport kinetics, which govern the temporal response of the optical device 300. However, once the optical device 300 reaches steady state, the metal oxide film 310 should have a substantially uniform oxygen vacancy concentration. In some designs, the substrate 340 may be patterned to have openings such that the metal oxide film 310 is a suspended membrane, thus allowing chemical exchange on both sides of the metal oxide film 310 with the surrounding environment. The optical device 300 may also be kept at an elevated temperature using a heater. As described above, the higher temperature increases the ionic conductance and the oxygen surface exchange of the metal oxide film 310, enabling a faster response time.

The thickness of the metal oxide film 310 may be chosen, in part, to support a desired time response. For example, a thinner metal oxide film 310 responds more quickly to changes in the atmospheric partial pressure of oxygen. The thickness may also be chosen to affect the optical response. For example, the metal oxide film 310 may have a thickness tailored to increase the transmittance (e.g., by decreasing the reflectance at a particular wavelength). When the atmospheric partial pressure of oxygen changes, the resultant change in the complex refractive index may cause the transmittance to decrease rendering the optical device 300 opaque. Generally, the metal oxide film 310 may vary in thickness between about 1 nm to about 10000 nm. The metal oxide film 310 may be formed from various metal oxide materials including, but not limited to, praseodymium-doped ceria or molybdenum trioxide.

The substrate 340 may be sufficiently thick to mechanically support the metal oxide film 310 during manufacture and operation. The substrate 340 may be formed from various materials including, but not limited to, silicon oxide, soda lime glass, borosilicate glass, yttrium stabilized zirconia (YSZ), silicon, silicon carbide, or any other compatible substrate materials. The substrate 340 may also have a melting point temperature higher than the operating temperatures of the optical device 300.

Figure 3B:
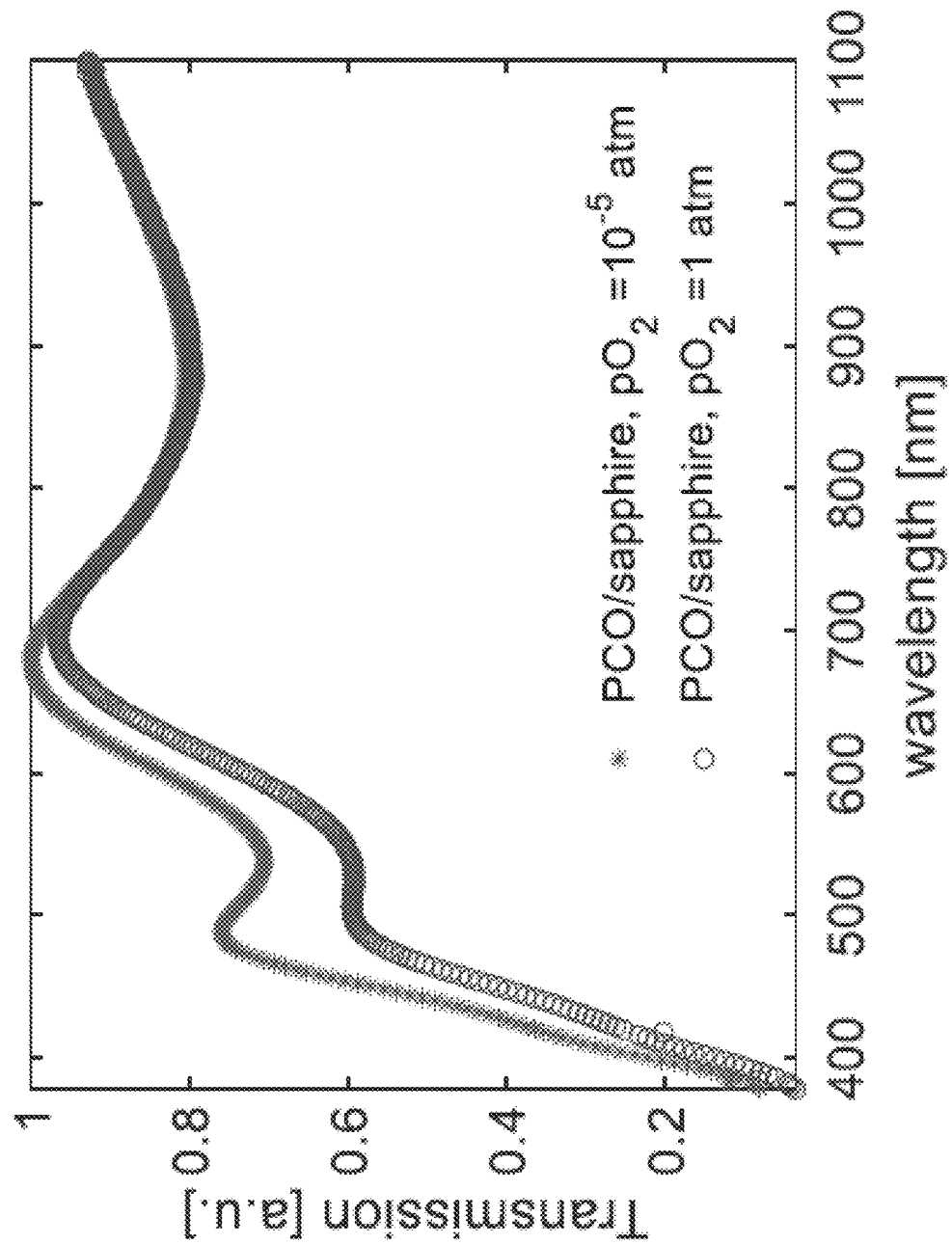
FIG. 3B shows transmission as a function of wavelength of an optical device based on the design shown in FIG. 3A at two partial pressures of oxygen.
Figure 3C:
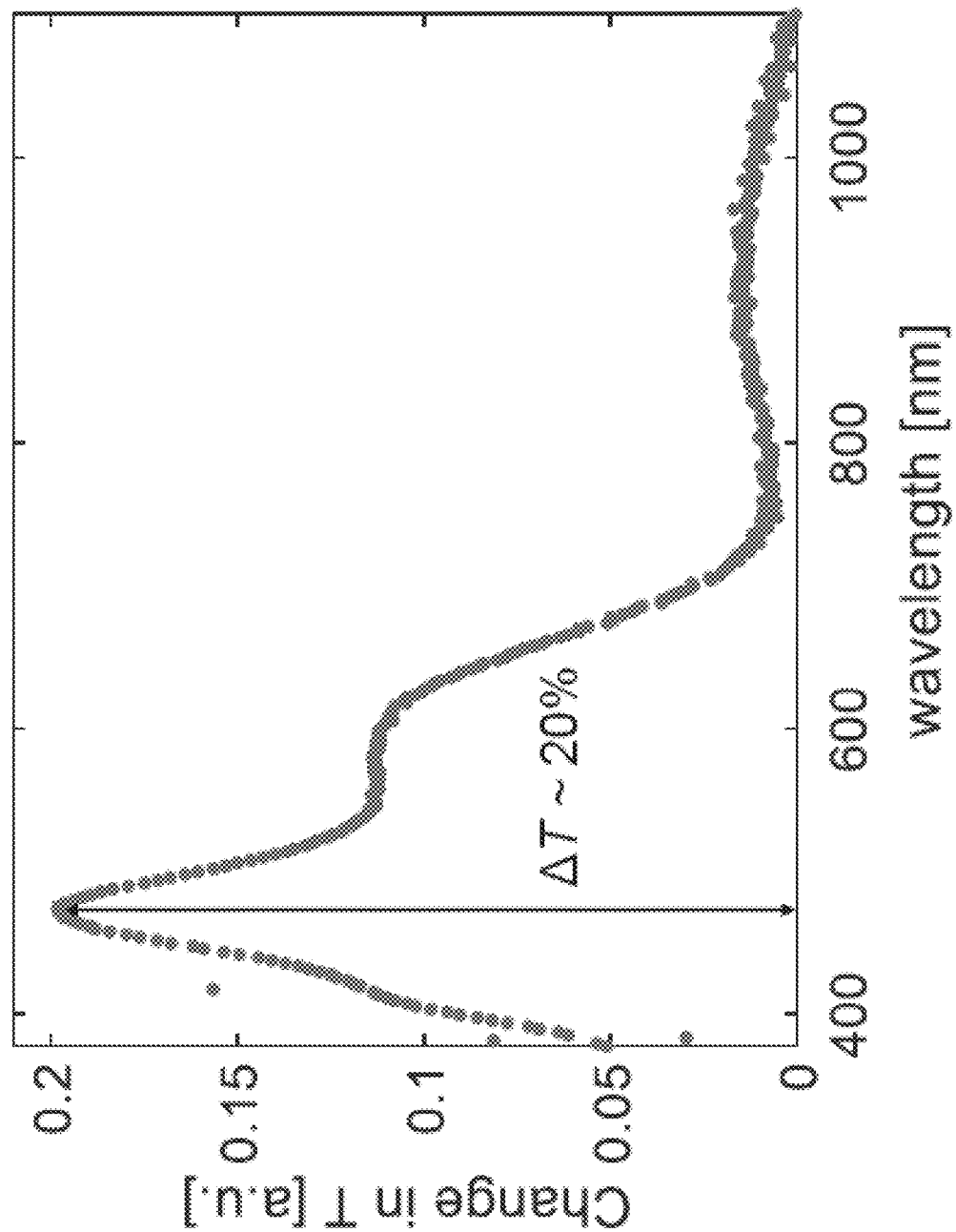
FIG. 3C shows the relative change in transmission based on the transmission curves at the two partial pressure of oxygens shown in FIG. 3B.
Figure 3D:
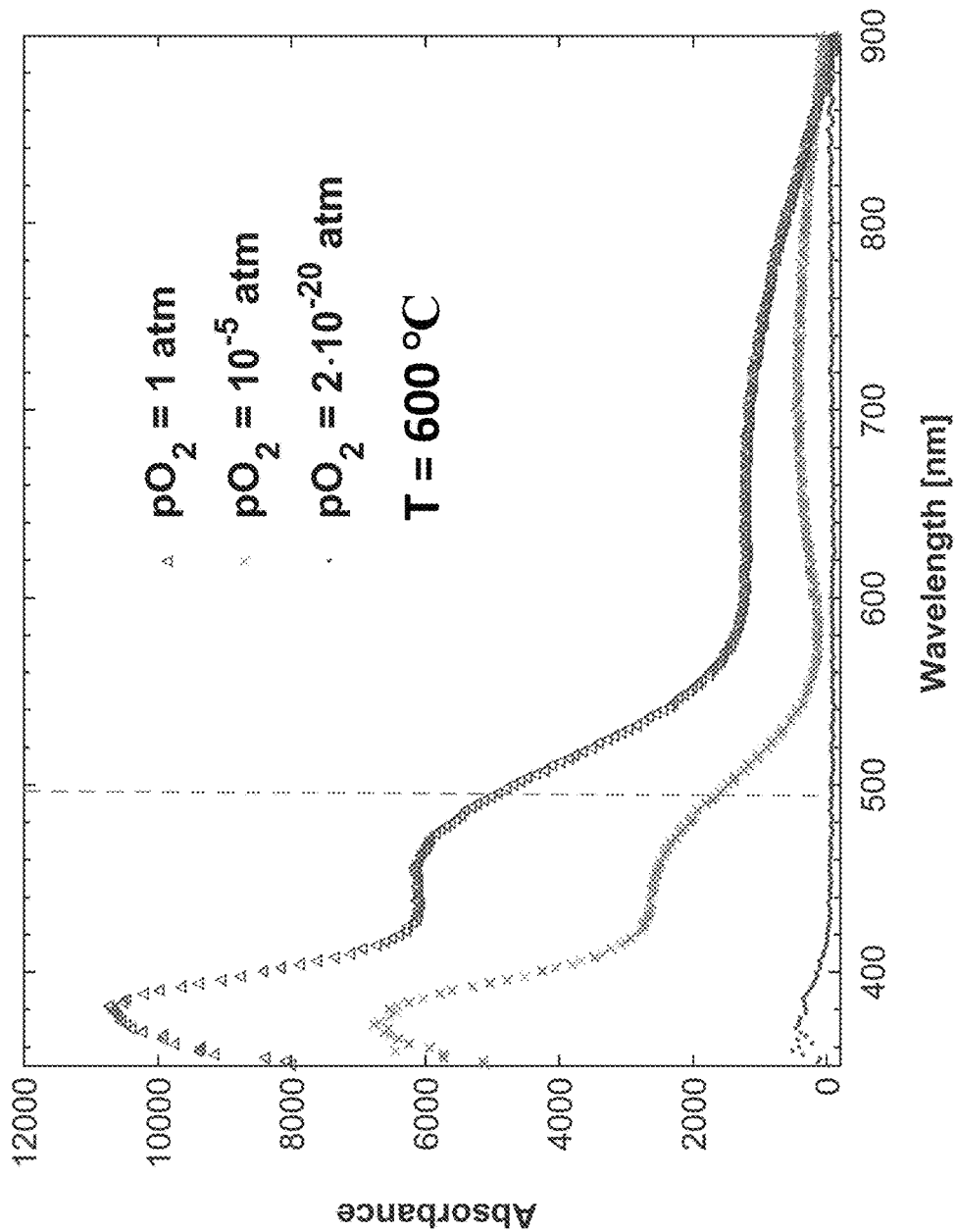
FIG. 3D shows the absorbance as a function of wavelength for a 250 nm thick metal oxide film with a similar design to the optical device in FIG. 3A at three partial pressures of oxygen.

FIGS. 3B and 3C show transmittance data as a function of wavelength for an exemplary optical device 300. The optical device 300 utilizes a 500 nm thick metal oxide film 310 formed from PCO. A 0.5 mm thick substrate 340 sapphire is used. FIG. 3B shows the normalized transmittance data at partial pressure of oxygens in the metal oxide film 210 of $10^{-5}$ atm and 1 atm and at a temperature of 800° C. As shown, the reduction in the oxygen concentration (or increase in oxygen vacancy concentration) increases the transparency of the optical device 200 at a wavelength of about 500 nm. FIG. 3C shows that the increase in transmittance is about 20% between both partial pressures of oxygen. FIG. 3D shows a plot of the absorbance as a function of the wavelength for a 250 nm thick PCO metal oxide film 110 at 600° C. showing two absorption peaks at wavelengths of about 370 nm and about 470 nm.

An Exemplary Application Measuring Bulk Ionic Conductivity

The optical device 100, as described above, may be used in various applications. For example, the inherent coupling between the change in optical properties and the ionic properties may enable optical measurements of the bulk ionic conductivity of the metal oxide film 110. Conventional measurements of bulk ion diffusion constants, $D_b$, in thin films are challenging, in part, because of low surface exchange rates. The time constant for changes in material properties are typically dominated by slow surface exchange rates in thin films.

In order to provide context for using the optical device 100 to measure the ionic mobility of the metal oxide film 110, FIGS. 4A-4D show a device 500, with a similar design to the optical device 100, configured to electrically measure the bulk ionic mobility of a PCO metal oxide film 510. The device 500 is used, in part, to show that the bulk ionic mobility may be extracted from an I-V response curve measured for various voltage sweeps. A similar design may be used in the optical device 100 to measure the ionic mobility both electrically and optically, thus correlating optical measurements of ionic mobility to electronic measurements of ionic mobility.

Figure 4A:
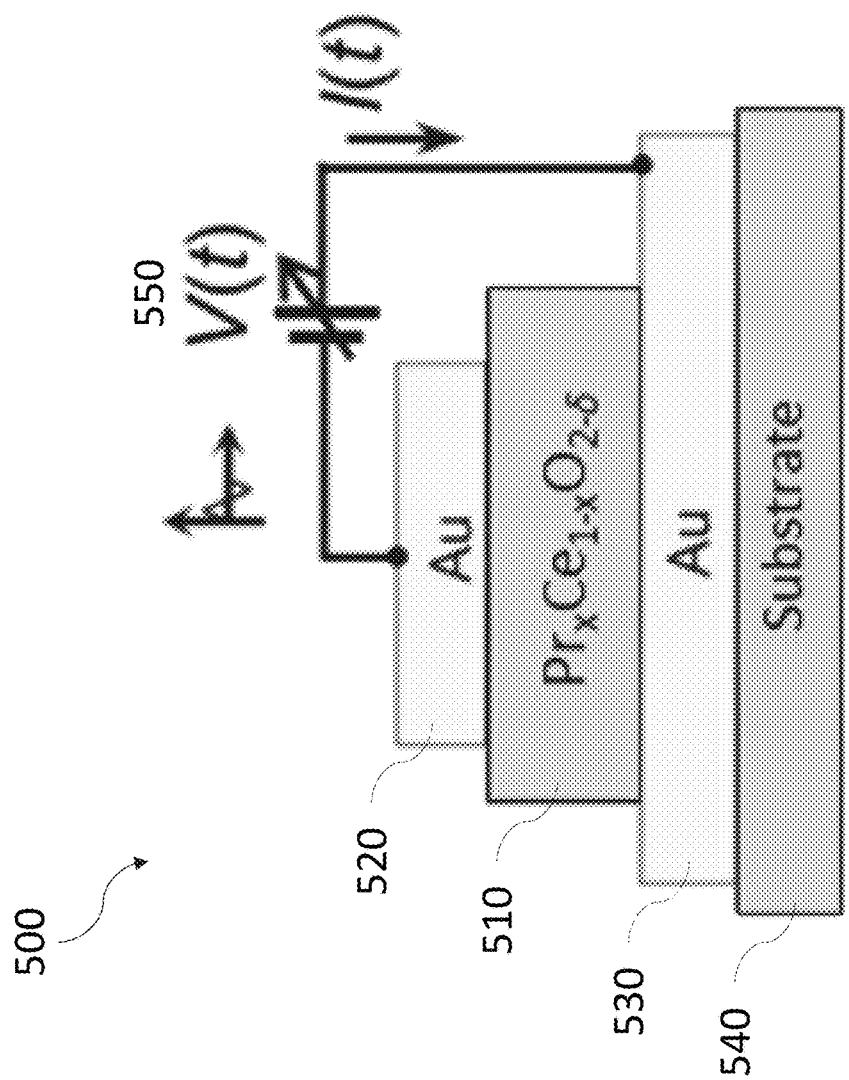
FIG. 4A shows a schematic illustration of a device with a similar design to FIG. 1A configured to only electrically measure the ionic mobility of oxygen vacancies with a $Pr_xCe_{1-x}O_{2-\delta}$ (PCO) metal oxide film and gold (Au) electrodes. The design may be incorporated into the design of FIG. 1A to enable optical measurements of the ionic mobility.
Figure 4B:
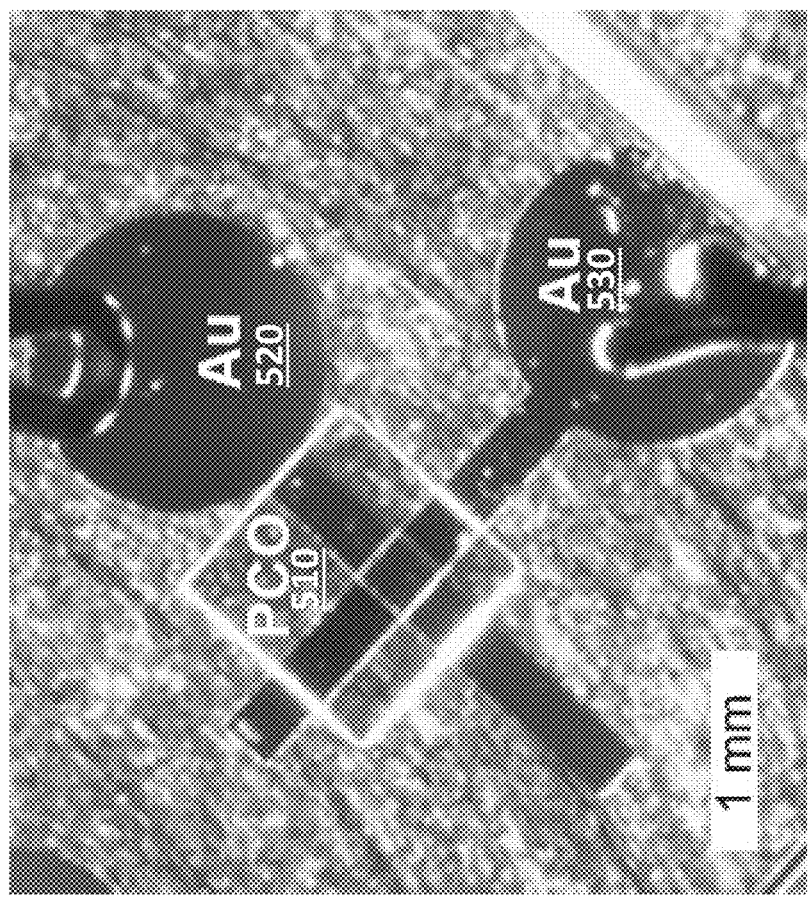
FIG. 4B shows an image of the device shown in FIG. 4A.

As shown in FIG. 4A, the device 500 includes a 500 nm thick PCO metal oxide film 510 disposed between a 100 nm thick gold (Au) first electrode 520 and a Au second electrode 530. The first electrode 520 and the second electrode 530 are electrically coupled to a voltage source 550. A substrate 540 formed of 0.5 mm thick sapphire is used to support the components of the optical device 500. FIG. 4B shows an image of the device 500 with the PCO metal oxide film 510, the Au first electrode 520, and the Au second electrode 530. The use of Au electrodes renders the device 500 opaque. However, transparent electrodes may instead be used to enable optical characterization of the metal oxide film 510, as will be described below.

Figure 4C:
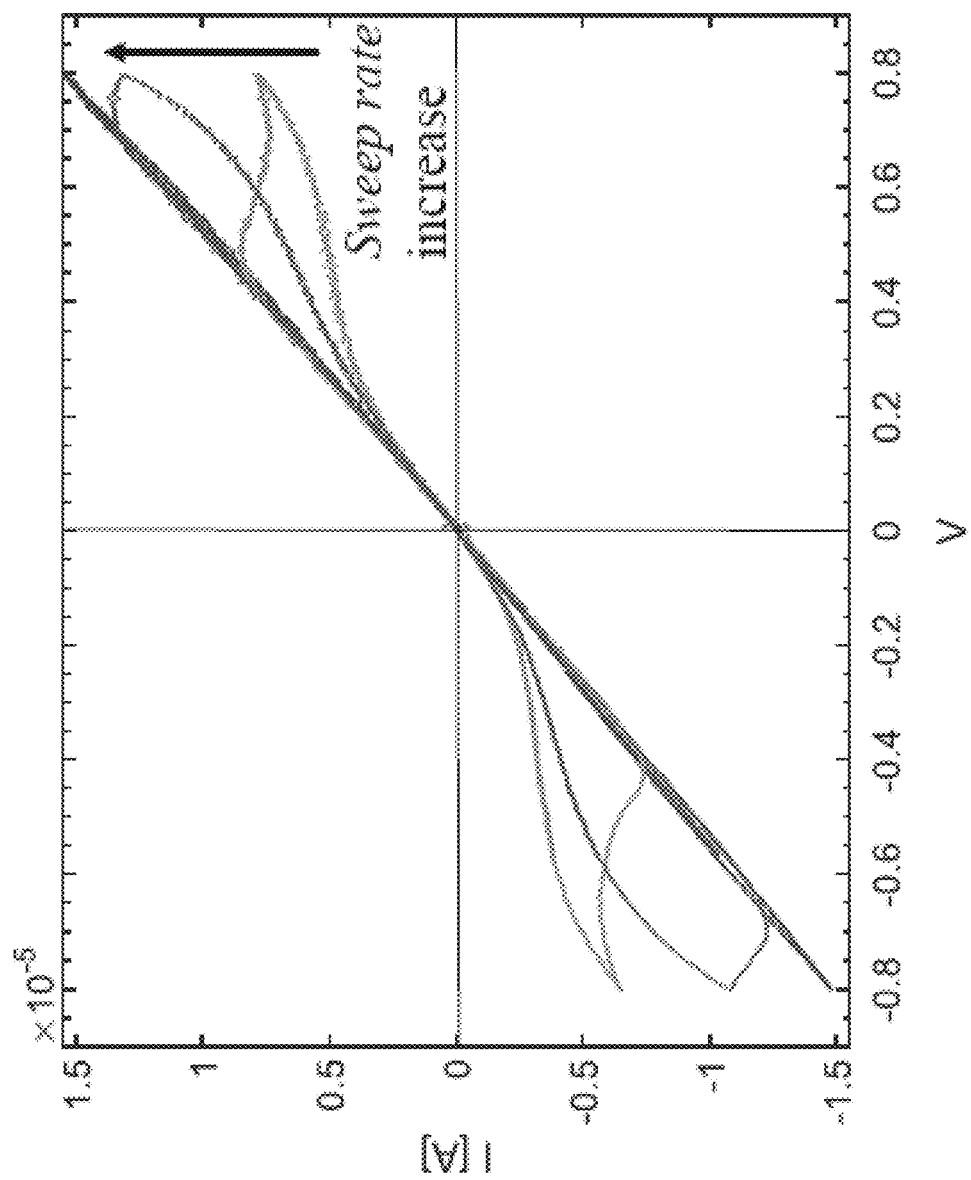
FIG. 4C shows the I-V response of the optical device shown in FIG. 4A for various linear voltage sweeps.
Figure 4D:
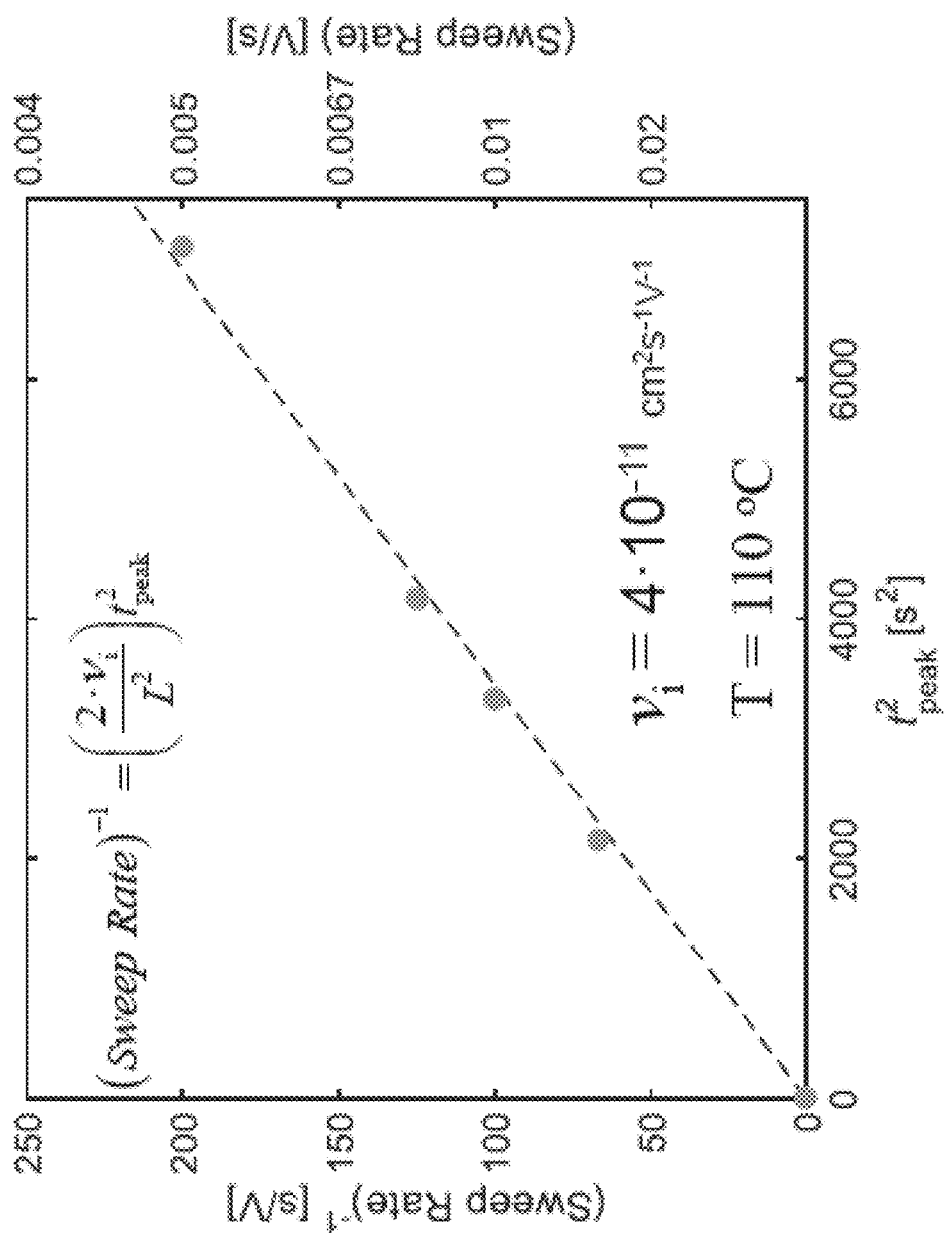
FIG. 4D shows the reciprocal of the voltage sweep rate as a function of the measured time to peak parameter, $t_{peak}^2$, for the optical device shown in FIG. 4A at a constant temperature of 110° C.

In order to electrically measure the bulk diffusion constant, the I-V response curve of the device 500 was measured for several linear voltage sweeps, as shown in FIG. 4C. A linear voltage sweep is a change in the applied bias voltage at a fixed rate. The bias voltage used has a triangular waveform with an amplitude of 0.8 V. This rate is varied between voltage sweeps, with the current through the optical device 500 measured for each voltage sweep to produce the data in FIG. 4C. As shown, a linear voltage sweep results in a hysteresis in the current response from the optical device 500. From the I-V response, the oxygen vacancy mobility in the PCO metal oxide film 510 can be extracted using the following relation, $$(\text{Sweep Rate})^{-1} = \left(\frac{2v_i}{L^2}\right) t_{peak}^2 \quad (1)$$

where Sweep Rate is the voltage sweep rate, which is a fixed value in a linear voltage sweep, $v_i$ is the oxygen vacancy mobility, L is the film thickness, and $t_{peak}$ is the time corresponding to the maximum current in the I-V response relative to the time the voltage period begins. FIG. 4D shows a plot of the inverse sweep rate as a function of $t_{peak}^2$ for several sweep rates. At a temperature of 110° C., the mobility was measured to be $v_i = 4 \cdot 10^{-11}$ cm$^2$ s$^{-1}$ V$^{-1}$.

Optical measurements of the device 500 shown in FIGS. 4A-4D were prevented, in part, by using opaque Au electrodes. However, if transparent electrodes are instead used, optical characterization of the metal oxide film 510 may also be possible in tandem with electrical measurements.

Figure 5A:
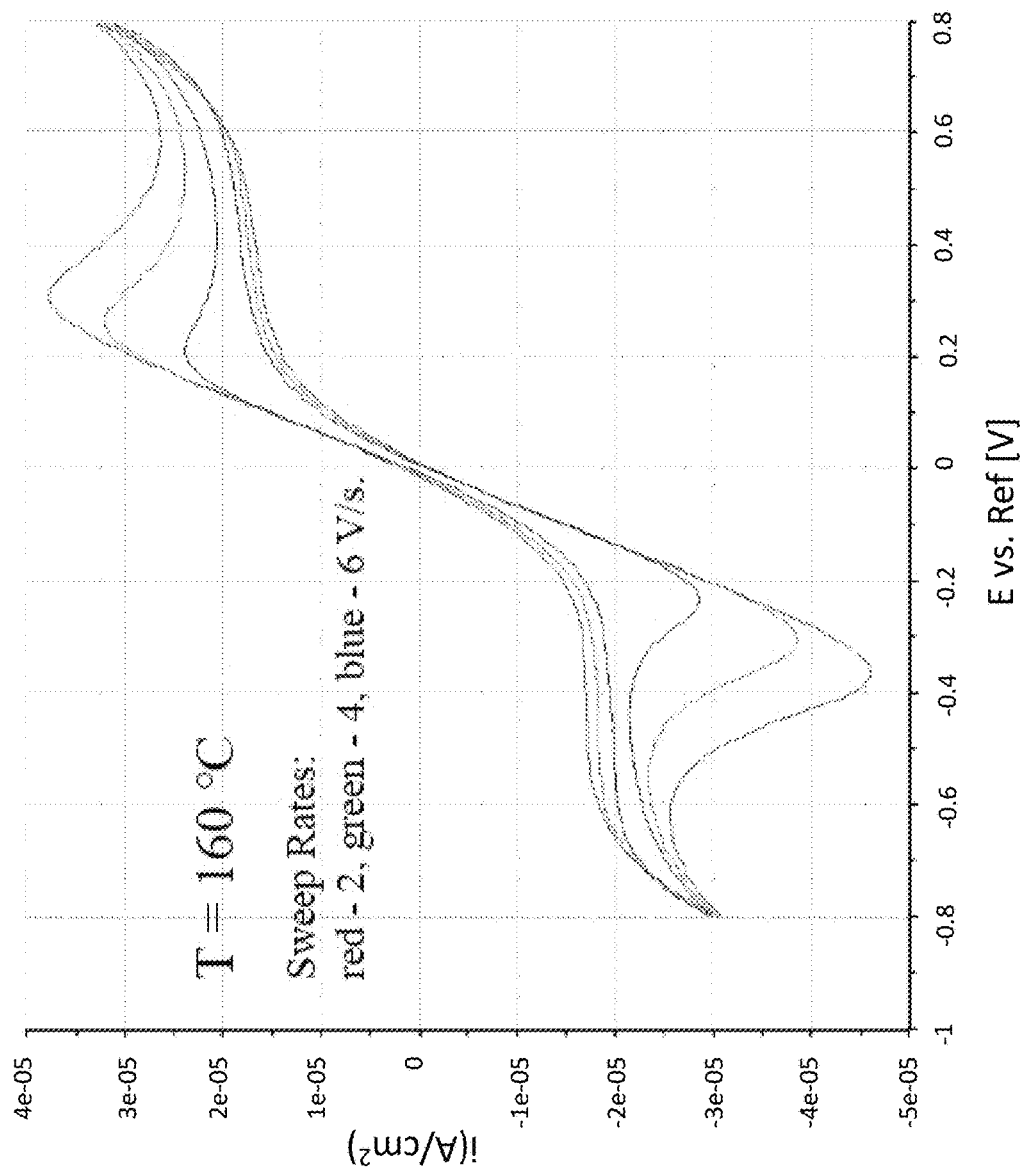
FIG. 5A shows the I-V response of an exemplary optical device based on the design shown in FIG. 1A with transparent electrodes
Figure 5B:
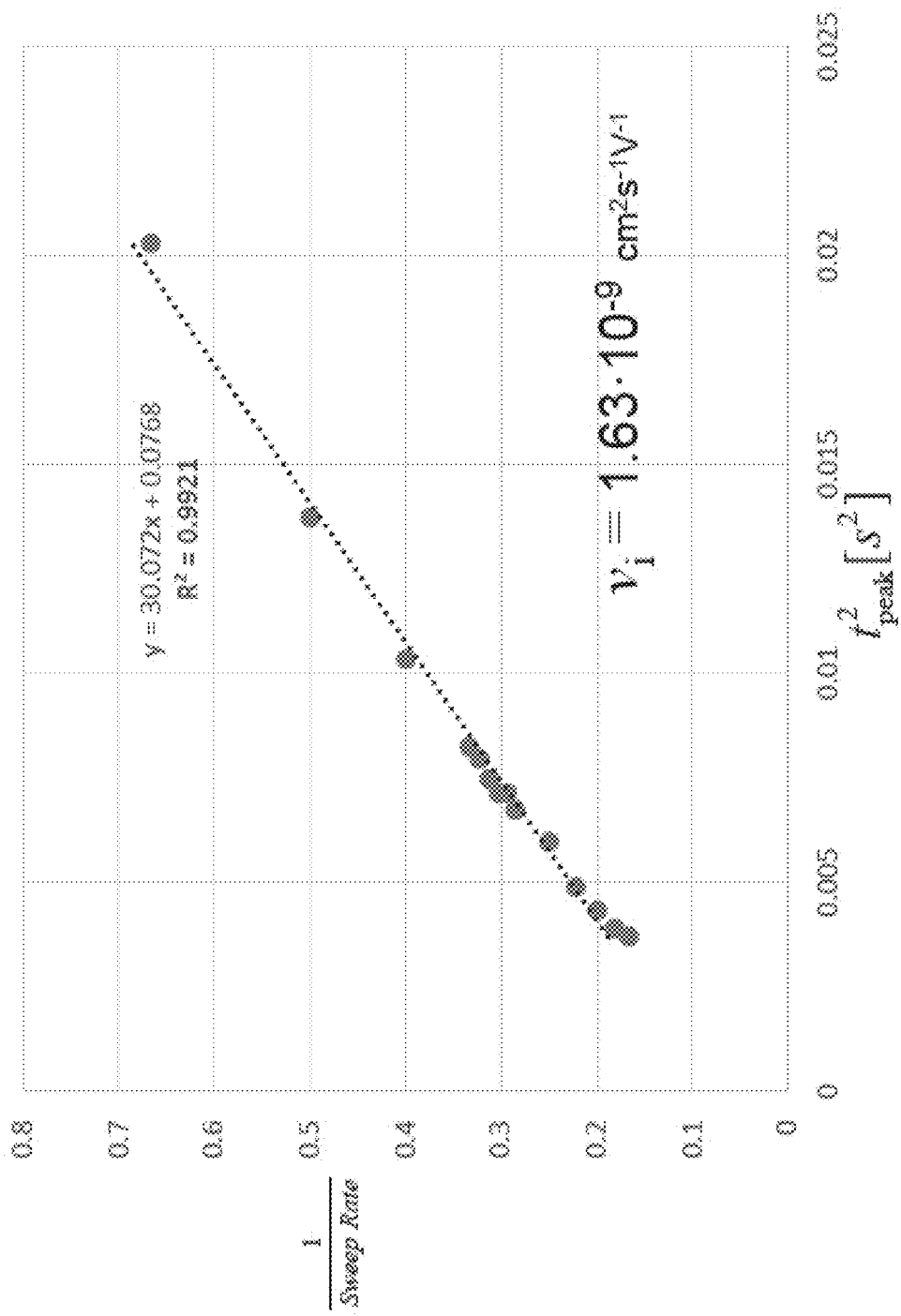
FIG. 5B shows the reciprocal of the voltage sweep rate as a function of the measured time to peak parameter, $t_{peak}^2$, for the optical device of FIG. 5A at a constant temperature of 160° C.
Figure 5C:
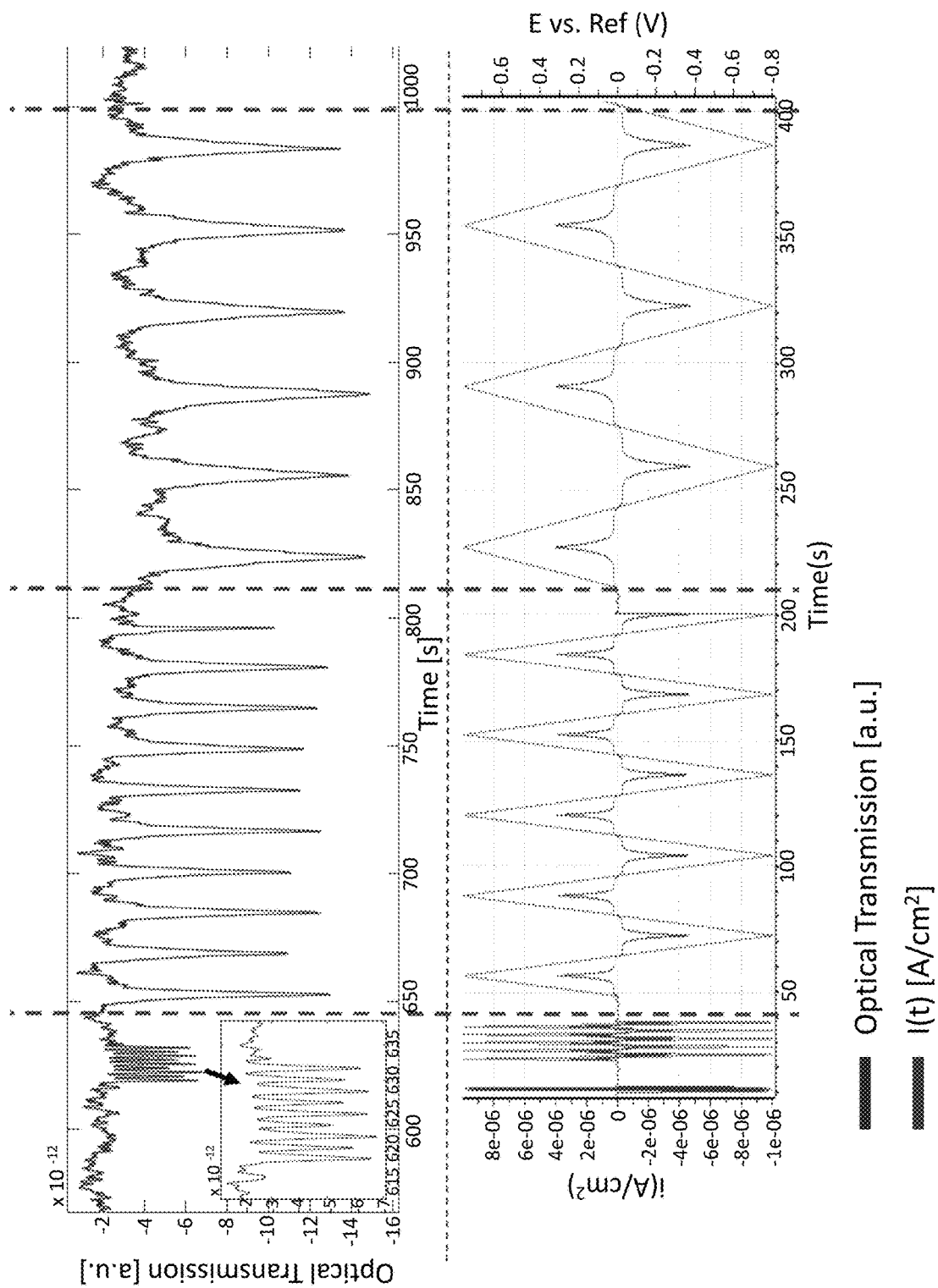
FIG. 5C shows the changes in the optical transmission of the optical device of FIG. 5A as a function of time in response to a time-varying applied voltage.

FIGS. 5A-5C show experimental data for another exemplary optical device 100 with transparent electrodes. The optical device 100 includes a 250 nm thick PCO metal oxide film 110 disposed between a 200 nm thick ITO first electrode 520 and a 200 nm thick ITO second electrode 130. FIG. 5A shows the I-V response for the optical device 500 at various linear voltage sweep rates including 2 V/s, 4V/s, and 6 V/s at a temperature of 160° C. As shown, the I-V response of the optical device 100 is similar to the I-V response of the device 500 in FIG. 4C. FIG. 5B shows the inverse sweep rate as a function of $t_{peak}^2$ for several sweep rates. Once again, the mobility of the oxygen vacancies can be extracted from this data and was determined to be $v_i = 1.63 \cdot 10^{-9}$ cm$^2$ s$^{-1}$ V$^{-1}$. The ionic mobility in this instance is higher than in FIGS. 4C and 4D due to the higher temperature. The data shows that the ionic mobility may be measured electrically in the optical device 100 similar to the device 500 of FIGS. 4A-4D.

FIG. 5C shows optical transmission data of the device 100 of FIGS. 5A and 5B as a function of time. As shown, the applied voltage is varied between +/−0.8 V at varying frequencies, which result in corresponding changes in the transmittance of the optical device 100 at the same frequency. In particular, the optical transmission decreases when the applied bias voltage reaches peak amplitude, which indicates an oxygen vacancy polarization is induced in the metal oxide film 110. Based on this data, the change in the optical properties may be attributed to the redistribution of oxygen vacancies under an applied bias voltage. Furthermore, the change in optical properties may be correlated to variations in the ionic mobility at different bias voltage sweeps.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving" "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An optical device, comprising:
    a first electrode that is substantially transparent to at least one wavelength of light and has an ionic conductance less than about $10^{-8}$ S;
    a second electrode; and
    a metal oxide film disposed between the first electrode and the second electrode,
    wherein:
        a bias voltage applied across the first electrode and the second electrode changes a mobile oxygen vacancy concentration in the metal oxide film, thereby changing a complex refractive index of the metal oxide film;
        the bias voltage causes the mobile oxygen vacancy concentration in the metal oxide film to change from being substantially uniform to varying spatially such that an oxygen vacancy polarization is induced;
        the oxygen vacancy polarization decreasing a transmittance of the metal oxide film at the at least one wavelength of light; and
        removal of the bias voltage causes the mobile oxygen vacancy concentration in the metal oxide film to become substantially uniform, thereby increasing the transmittance of the metal oxide film at the at least one wavelength of light.

2. The optical device of claim 1, further comprising:
    a solid electrolyte layer disposed between the metal oxide film and the second electrode, to exchange oxygen ions with the metal oxide film in response to the bias voltage.

3. The optical device of claim 1, wherein the second electrode is substantially transparent to the at least one wavelength of light.

4. The optical device of claim 1, wherein the second electrode has an ionic conductance of less than about $10^{-8}$ S.

5. The optical device of claim 1, wherein the metal oxide film has a thickness from about 10 nm to about 500 nm.

6. The optical device of claim 1, wherein the metal oxide film includes at least one of praseodymium-doped ceria, iron doped strontium titanate, lanthanum doped barium tin oxide, tungsten oxide, or molybdenum trioxide.

7. An optical device, comprising:
    a first electrode that is substantially transparent to at least one wavelength of light and has an ionic conductance less than about $10^{-8}$ S;
    a second electrode; and
    a metal oxide film disposed between the first electrode and the second electrode, wherein:
a bias voltage applied across the first electrode and the second electrode changes a mobile oxygen vacancy concentration in the metal oxide film, thereby changing a complex refractive index of the metal oxide film;
the bias voltage causes an increase in the mobile oxygen vacancy concentration by electrochemically pumping oxygen ions out of the metal oxide film and through the second electrode; and
the increase in the mobile oxygen vacancy concentration increasing the transmittance of the optical device at the at least one wavelength of light.

8. The optical device of claim 7, further comprising:
an oxygen storage layer, disposed on the second electrode, to supply oxygen ions to and receive oxygen ions from the metal oxide film.

9. The optical device of claim 7, wherein the second electrode is substantially transparent to the at least one wavelength of light.

10. The optical device of claim 7, wherein the second electrode has an ionic conductance of less than about $10^{-8}$ S.

11. The optical device of claim 7, wherein the metal oxide film has a thickness from about 10 nm to about 500 nm.

12. The optical device of claim 7, wherein the metal oxide film includes at least one of praseodymium-doped ceria, iron doped strontium titanate, lanthanum doped barium tin oxide, tungsten oxide, or molybdenum trioxide.

13. A method of changing a transmittance of an optical device comprising a metal oxide film disposed between a first transparent electrode having an ionic conductance less than about $10^{-8}$ S and a second electrode, comprising:
applying a bias voltage across the metal oxide film across the first transparent electrode and the second electrode, the bias voltage causing a mobile oxygen vacancy concentration in the metal oxide film to increase, thereby changing the metal oxide film from an opaque state to a transparent state through a change in a complex refractive index of the metal oxide film; and
while the metal oxide film is in the transparent state, transmitting light through the metal oxide film and the transparent electrode,
wherein applying the bias voltage electrochemically pumps oxygen ions out of the metal oxide film and through the second electrode.

14. The method of claim 13, further comprising:
preventing oxygen ions from leaving or entering the metal oxide film while applying the bias voltage.

15. The method of claim 13, wherein applying the bias voltage comprises applying a negative bias voltage that electrochemically pumps oxygen ions out of the metal oxide film.

16. The method of claim 13, before applying the bias voltage, comprising:
heating the metal oxide film to increase an ionic conductance of the metal oxide film such that the change in the mobile oxygen vacancy concentration occurs in less than 1 ns.

17. The method of claim 16, wherein heating the metal oxide film comprises applying at least one of an electrical pulse or a laser pulse to the metal oxide film.

18. The method of claim 16, further comprising:
cooling the metal oxide film such that the mobile oxygen vacancy concentration varies less than 1% for more than 1 ns; and
removing the bias voltage applied to the first transparent electrode and the second electrode.

19. The method of claim 13, further comprising:
removing the bias voltage while keeping the metal oxide film in the transparent state.

20. The method of claim 19, wherein the bias voltage is a first bias voltage having a first polarity, and further comprising:
applying a second bias voltage having a second polarity opposite to the first polarity to the metal oxide film, the second bias voltage causing a change in the mobile oxygen vacancy concentration that changes the metal oxide film from the transparent state to the opaque state.

21. The method of claim 13, wherein changing the metal oxide film from the opaque state to the transparent state occurs in less than about 100 ns.

* * * * *